US012796585B2

(12) United States Patent
Moellers et al.

(10) Patent No.: US 12,796,585 B2
(45) Date of Patent: Nov. 17, 2026

(54) SYSTEM AND METHOD OF WORK IMPLEMENT ENGAGEMENT CONTROL

(71) Applicant: Deere & Company, Moline, IL (US)

(72) Inventors: Jacob J. Moellers, Aurora, IA (US); Dastagiri Dudekula, Prosper, TX (US); Curtis A. Maeder, Indianola, IA (US); Steven R. Procuniar, Urbandale, IA (US); Qiang R. Liu, Urbandale, IA (US); Ray M. Scheufler, Johnston, IA (US); Cody W. Best, East Moline, IL (US); Nicholas C. Baltz, Port Byron, IL (US)

(73) Assignee: Deere & Company, Moline, IL (US)

( * ) Notice: Subject to any disclaimer, the term of this patent is extended or adjusted under 35 U.S.C. 154(b) by 98 days.

(21) Appl. No.: 18/934,301

(22) Filed: Nov. 1, 2024

(65) Prior Publication Data

US 2026/0123565 A1 May 7, 2026

(51) Int. Cl.
*A01B 79/00* (2006.01)
*E02F 9/20* (2006.01)

(52) U.S. Cl.
CPC .......... *A01B 79/005* (2013.01); *E02F 9/2037* (2013.01)

(58) Field of Classification Search
CPC ............................. A01B 79/005; E02F 9/2037
See application file for complete search history.

(56) References Cited

U.S. PATENT DOCUMENTS

| | | | | |
|---|---|---|---|---|
| 6,236,924 | B1 * | 5/2001 | Motz | G05D 1/0274 342/359 |
| 7,739,015 | B2 | 6/2010 | Senneff et al. | |
| 8,560,182 | B2 | 10/2013 | Ringwald et al. | |
| 8,635,011 | B2 | 1/2014 | Senneff et al. | |

(Continued)

FOREIGN PATENT DOCUMENTS

| | | | | |
|---|---|---|---|---|
| AU | 2013200397 A1 * | 8/2013 | | A01D 41/127 |
| EP | 3299996 B1 | 3/2022 | | |

(Continued)

*Primary Examiner* — Harry Y Oh

(74) *Attorney, Agent, or Firm* — Gary L. Montle; Lucian Wayne Beavers; Patterson Intellectual Property Law, PC

(57) ABSTRACT

Systems and methods are provided for controlling engagement of a work implement assembly with surface portions of a work area having respective engagement constraints corresponding to various zones and/or boundaries associated therewith. Engageable surface portions (corresponding to a working length and width of the work implement assembly) of the work area to be traversed are continuously predicted, and associated constraint levels therefor. An operating mode for the work machine is determined, from multiple operating modes comprising a first mode specifying full engagement of an engageable surface portion without overlapping constraints and a second mode specifying full disengagement of an engageable surface portion overlapping one or more constraints. For each predicted engageable surface portion of the work area, prior to traverse thereof, the work implement assembly is automatically actuated for engagement or disengagement based on determined engagement constraints corresponding to the predicted engageable surface portion and the operating mode.

20 Claims, 19 Drawing Sheets

(56) References Cited

U.S. PATENT DOCUMENTS

| | | | |
|---|---|---|---|
| 9,719,217 | B2 | 8/2017 | Fritz et al. |
| 9,896,810 | B2 | 2/2018 | Berning et al. |
| 9,915,041 | B2 | 3/2018 | Berning et al. |
| 10,575,454 | B2 | 3/2020 | De Nale et al. |
| 10,588,258 | B2 | 3/2020 | Jung et al. |
| 10,687,466 | B2 | 6/2020 | Reed et al. |
| 11,051,452 | B2 | 7/2021 | Gutknecht et al. |
| 11,122,740 | B2 | 9/2021 | Middelberg et al. |
| 11,340,092 | B2 | 5/2022 | Colosky et al. |
| 11,632,905 | B2 | 4/2023 | Herrmann et al. |
| 11,758,846 | B2 | 9/2023 | Martin et al. |
| 11,845,449 | B2 | 12/2023 | Vandike et al. |
| 11,882,790 | B2 | 1/2024 | Fillep et al. |
| 11,997,947 | B2 | 6/2024 | Hunt et al. |
| 2004/0193348 | A1 | 9/2004 | Gray et al. |
| 2009/0037058 | A1 | 2/2009 | Senneff et al. |
| 2009/0037096 | A1 | 2/2009 | Senneff et al. |
| 2010/0287898 | A1 | 11/2010 | Ringwald et al. |
| 2011/0160968 | A1 | 6/2011 | Van Bergeijk |
| 2017/0118915 | A1 | 5/2017 | Middelberg et al. |
| 2017/0245434 | A1 | 8/2017 | Jung et al. |
| 2018/0054954 | A1 | 3/2018 | De Nale et al. |
| 2019/0129435 | A1* | 5/2019 | Madsen ............... A01B 69/001 |
| 2019/0230855 | A1 | 8/2019 | Reed et al. |
| 2020/0170187 | A1 | 6/2020 | Gutknecht et al. |
| 2021/0185880 | A1 | 6/2021 | Martin et al. |
| 2021/0185917 | A1 | 6/2021 | Hunt et al. |
| 2021/0282319 | A1 | 9/2021 | Fillep et al. |
| 2023/0000007 | A1 | 1/2023 | Sawlaw et al. |
| 2023/0000015 | A1 | 1/2023 | Herrmann et al. |
| 2023/0062392 | A1 | 3/2023 | Brokaw et al. |
| 2023/0157208 | A1 | 5/2023 | Farley et al. |
| 2023/0240170 | A1 | 8/2023 | Goering |
| 2023/0263083 | A1 | 8/2023 | Rains et al. |
| 2023/0320254 | A1 | 10/2023 | Vandike et al. |
| 2023/0389462 | A1 | 12/2023 | Liu et al. |
| 2024/0155964 | A1* | 5/2024 | White .................. A01B 79/005 |
| 2024/0172580 | A1* | 5/2024 | Schroeder ............... G01S 13/88 |
| 2024/0237579 | A1 | 7/2024 | Vadnere et al. |

FOREIGN PATENT DOCUMENTS

| | | | |
|---|---|---|---|
| JP | 2006006167 | A | 1/2006 |
| JP | 2023167733 | A | 11/2023 |
| WO | 2023159160 | A1 | 8/2023 |

* cited by examiner

SYSTEM AND METHOD OF WORK IMPLEMENT ENGAGEMENT CONTROL

FIELD OF THE DISCLOSURE

The present disclosure relates generally to work machines having associated work implements, for example towed by or otherwise associated with self-propelled work vehicles, and more particularly to a method and system for engagement control of such work implements with respect to a working area thereof.

BACKGROUND

FIGS. 1A-4 show various examples of work machines 100 and associated work implement assemblies 102, description of which is merely provided for illustration of certain problems solved by a system and method of the present disclosure. A work machine 100 and associated work implement assembly 102 within the scope of the present disclosure is not limited in any way to the examples to follow, unless otherwise specifically noted. The particular work machine depicted may be generally referred to as work machine 100 or more specifically its respective label 100*a*, 100*b*, etc.

FIGS. 1A and 1B illustrate a tillage work machine 100*a* comprising a work vehicle towing a work implement assembly 102 having a frame supporting a plurality of tools for working (e.g., ripping) the terrain when lowered for engagement thereof. The work implement assembly has a physical length 104 which may be distinguished from a working length 106, or in other words a combination of a front working length 108 corresponding to a front working area 116 of the assembly and a rear working length 110 corresponding to a rear working area 118 of the assembly. The work implement assembly in this example also has a physical width 112 which generally corresponds to a working width 114 of the plurality of tools, but this is not necessarily the case in other embodiments of the work machine. In the example shown, the working length of the assembly is entirely comprised of ripping tools, but in alternative embodiments a front working length and a rear working length may be comprised of different tools for different purposes in the same operation.

FIGS. 2A and 2B illustrate a spraying work machine 100*b* comprising a work vehicle having a first work implement assembly 102*a* integrated, mounted, or otherwise attached to a front end thereof, and a second work implement assembly 102*b* integrated, mounted, or otherwise attached to a rear end thereof. Each of the work implement assemblies include a respective front working area 116*a*, 116*b* and a respective rear working area 118*b*, 118*b*, for example having various nozzles and configured for treatment of terrain by spraying product thereupon. Nozzles may for example be arranged in various rows or ranks for spraying in different areas when operatively engaging the ground surface, or may be arranged in a single row but configured to spray in different (e.g., front and rear) directions when operatively engaging the ground surface.

FIG. 3 illustrates a planter work machine 100*c* comprising a work vehicle having an associated work implement assembly 102 with a front working area 116 and a rear working area 118, at least one of which includes a plurality of tools for planting seeds in the ground when operatively lowered for engagement therewith.

FIG. 4 illustrates a combine harvester work machine 100*d* driving a work implement assembly 102 with a front working area 116 configured in various embodiments to engage and cut crop when operatively lowered and a rear working area 118 configured in various embodiments to process and/or direct the cut crop.

Referring now to FIG. 5, a work area 120 in the context of the present disclosure may for example represent a field having one or more non-traversable boundary 122 (e.g., an exterior boundary), an interior headland 124 defined by a headland boundary 126, and an interior mainland 128 or equivalent area for growing a crop or other vegetation, or another type of area including terrain to be worked by one or more work implement assemblies 102 associated with a work machine 100. In the context of a field as the work area, for example, the work machine may need to traverse the entire work area (e.g., mainland) or a portion thereof to plant a crop, to treat a crop, to harvest a crop, or to perform another task associated with the crop or vegetation, to name non-limiting examples. In some cases, a headland area may be traversed by the work machine but does not include an area to be planted or treated, whereas the exterior boundary defines an area which is not to be crossed or otherwise traversed.

Within such a work area 120 may also be portions such as waterways 134 that should not be worked by the work machine. In the example shown in FIG. 5, a waterway extending across the work area is represented as being defined by a non-traversable boundary 122 or an auxiliary boundary 132 which defines an area not to be engaged during operation but nonetheless allowing for traverse by work machines as needed. Another waterway is represented as fully within the work area, and defined as further within a traversable but non-engageable boundary area 130 or another headland area 124 which may be defined as traversable and engageable (or optionally non-engageable), depending on the context.

As previously noted, various work machines 100 may include a work implement assembly 102 having a total working area (a combination of front 116 and rear 118 working areas), for example defined by a working length 106 and a working width 114. In many contexts, a current section control is applied wherein the entire total working area of the work implement assembly will selectively engage (or disengage from) the terrain during a working operation.

However, with reference to FIG. 6 and using the example of a tillage work machine 100*a* from FIGS. 1A and 1B, when an entire work implement assembly is raised or lowered near boundaries based on a line segment as the control parameter, the user will typically encounter partial work occurring in portions of the work area where full work is intended (e.g., partial tilling of the headland during headland turns, as represented with the label 136), and/or partial work occurring in portions of the work area where no work is intended (e.g., tilling of the ground in waterways, as represented with the label 138). These problems may understandably be exacerbated for work implement assemblies having a particularly long working length.

Related problems may arise where, for example, the frame of the work implement assembly is raised when moved to a headland to work inside the headland area, or based on a need to raise the frame of the work implement assembly in the mainland and/or the headland during special maneuvers where otherwise the conventional control technique may leave the assembly in place.

BRIEF SUMMARY

The current disclosure provides an enhancement to conventional control techniques, at least in part by introducing a novel system and method for automatically controlling engagement and disengagement (e.g., raising, lowering) a work implement assembly frame when traversing, entering, and exiting field boundaries and previously covered areas by using a two-dimensional working area of the work implement assembly. In some embodiments within the scope of the present disclosure, a three-dimensional working volume of the work implement assembly is further considered.

A system and method as disclosed herein may desirably reduce the need for constant manual control by the operator during such events, further allowing for higher driving speeds in many applications, at least by allowing for automatic adjustment to the machine settings.

It should be noted that while the examples referenced above for a work machine and an associated work implement are described with respect to agricultural applications, similar problems may arise in other applications such as for example with respect to construction, road building, and the like, and solutions within the scope of the present disclosure are not limited to the specific examples provided.

Exemplary embodiments of systems and methods as disclosed herein may reference a digital model of the work implement assembly to identify an engageable surface area, and a map of the work area, alone or further including a digital history or coverage map spatially representing prior work performed in the work area, to perform hit tests for each predicted engageable surface area to be traversed by the work machine, and selectively control engagement or disengagement of the work implement assembly based thereon.

According to an embodiment as disclosed herein, a method is provided for controlling operation of a work machine in a work area, the work machine comprising a work implement assembly configured in response to control signals to operatively engage a surface portion of the work area or to disengage therefrom. Respective engagement constraints are determined corresponding to one or more zones and/or boundaries associated with the work area. During operation by the work machine in the work area, the method includes continuously predicting engageable surface portions of the work area to be traversed, and associated constraint levels therefor, wherein the engageable surface portions correspond to a working length and a working width defined by the work implement assembly. An operating mode is determined for the work machine during the operation, wherein the operating mode is determined from a plurality of operating modes comprising a first mode specifying full engagement of an engageable surface portion without overlapping constraints and a second mode specifying full disengagement of an engageable surface portion overlapping one or more constraints. For each predicted engageable surface portion of the work area, and prior to traverse thereof, the method further includes automatically actuating the work implement assembly for engagement or disengagement based on determined engagement constraints corresponding to the predicted engageable surface portion and the operating mode.

In an exemplary and optional aspect according to the above-referenced method embodiment, the work machine may comprise one or more components for processing of ingested crop material, wherein one or more settings for at least one of the one or more components are automatically adjusted, for example enabling or disabling certain components, based on determined internal processing constrains corresponding to the predicted engageable surface portion and the operating mode.

In another exemplary and optional aspect according to the above-referenced method embodiment, the plurality of operating modes may comprise at least a third mode specifying automatic enabling or disabling of the least one of the one or more components independent of changes to engagement or disengagement of the engageable surface portion.

In another exemplary and optional aspect according to the above-referenced method embodiment, the work area may be mapped during operation by the work machine therein to store further engagement constraints corresponding to coverage zones and/or boundaries.

In another exemplary and optional aspect according to the above-referenced method embodiment, the work implement assembly may be automatically actuated further based on a look-ahead time between a current leading edge of the work implement assembly and a trailing edge of the predicted engageable surface portion of the work area.

In another exemplary and optional aspect according to the above-referenced method embodiment, the look-ahead time may be determined based on a current travel speed and/or a system delay associated with transition of the work implement assembly from operative engagement to disengagement.

In another exemplary and optional aspect according to the above-referenced method embodiment, the working length and the working width of the work implement assembly may be determined by reference to a digital model.

In another exemplary and optional aspect according to the above-referenced method embodiment, the digital model may be generated based at least in part on observations of the working length and the working width of engaged surface portions during previous operation of the work implement assembly.

In another exemplary and optional aspect according to the above-referenced method embodiment, one or more of the plurality of operating modes may define overlap of the engageable surface portion with respect to an entire working area of the work implement assembly.

In another exemplary and optional aspect according to the above-referenced method embodiment, one or more of the plurality of operating modes may define overlap of the engageable surface portion with respect to one or more sides of the working length and/or the working width of the work implement assembly.

In another exemplary and optional aspect according to the above-referenced method embodiment, operative engagement by the work implement assembly may comprise applying treatment to the respective surface portion of the work area, and operative disengagement by the work implement assembly may comprise suspending the application of treatment to the respective surface portion of the work area.

In another exemplary and optional aspect according to the above-referenced method embodiment, operative engagement by the work implement assembly may comprise moving the work implement assembly to physically engage with the respective surface portion of the work area, and operative disengagement by the work implement assembly may comprise moving the work implement assembly away from physical engagement with the respective surface portion of the work area.

In another exemplary and optional aspect according to the above-referenced method embodiment, the operating mode may be determined according to user selection via a user interface. Alternatively, or additionally, the operating mode may be determined according to a type of work operation.

In another embodiment, a system is disclosed herein for controlling a working operation in a work area. A work machine comprises a work implement assembly configured in response to control signals to operatively engage a surface portion of the work area or to disengage therefrom. One or more processors are functionally linked to the work machine and configured to direct the performance of steps substantially in accordance with the above-referenced method embodiment and optionally one or more of the exemplary aspects therefor.

Numerous objects, features and advantages of the embodiments set forth herein will be readily apparent to those skilled in the art upon reading of the following disclosure when taken in conjunction with the accompanying drawings.

DETAILED DESCRIPTION

With further reference herein to FIGS. 7-20, various embodiments may now be described of an inventive system and method.

Figure 1A:
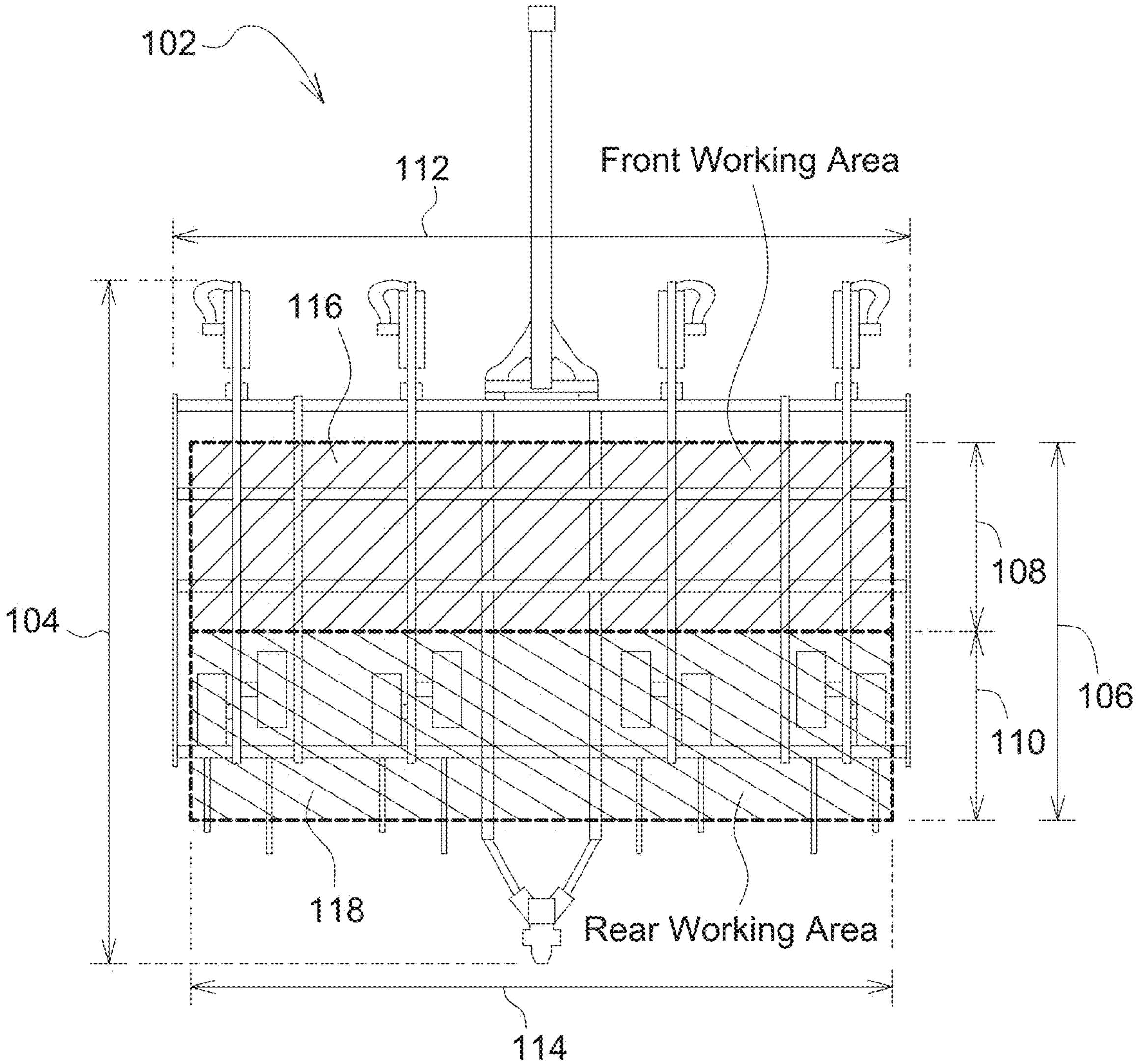
FIGS. 1A and 1B are top and side views, respectively, representing an embodiment of a work implement for tilling operations.
Figure 1B:
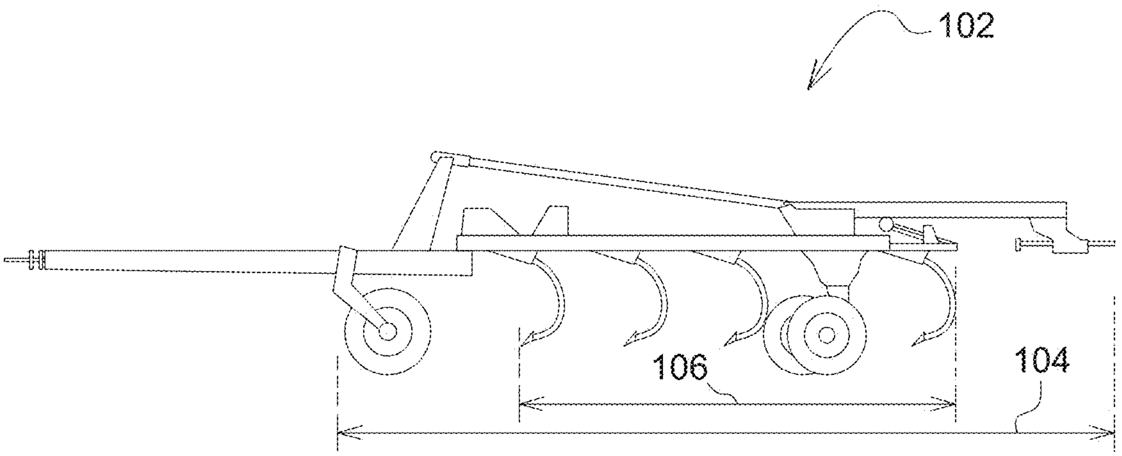
Figure 2A:
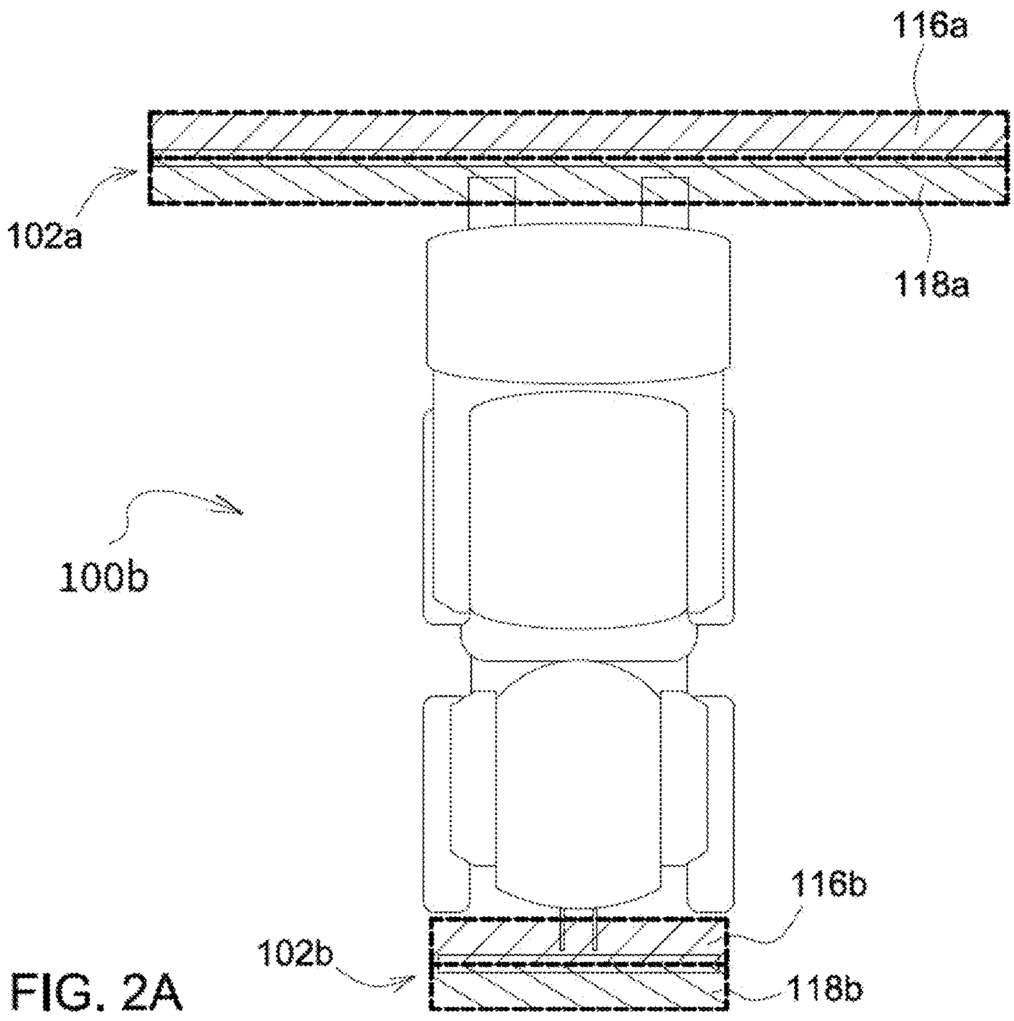
FIGS. 2A and 2B are top and side views, respectively, representing an embodiment of a work machine and associated work implement for spraying operations.
Figure 2B:
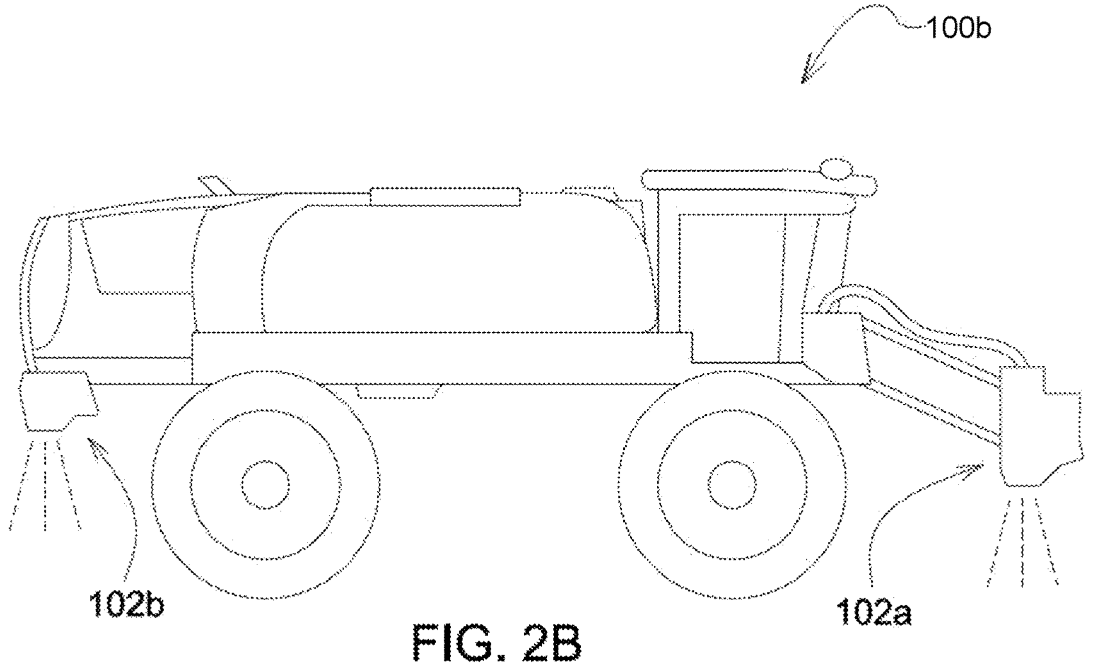
Figure 3:
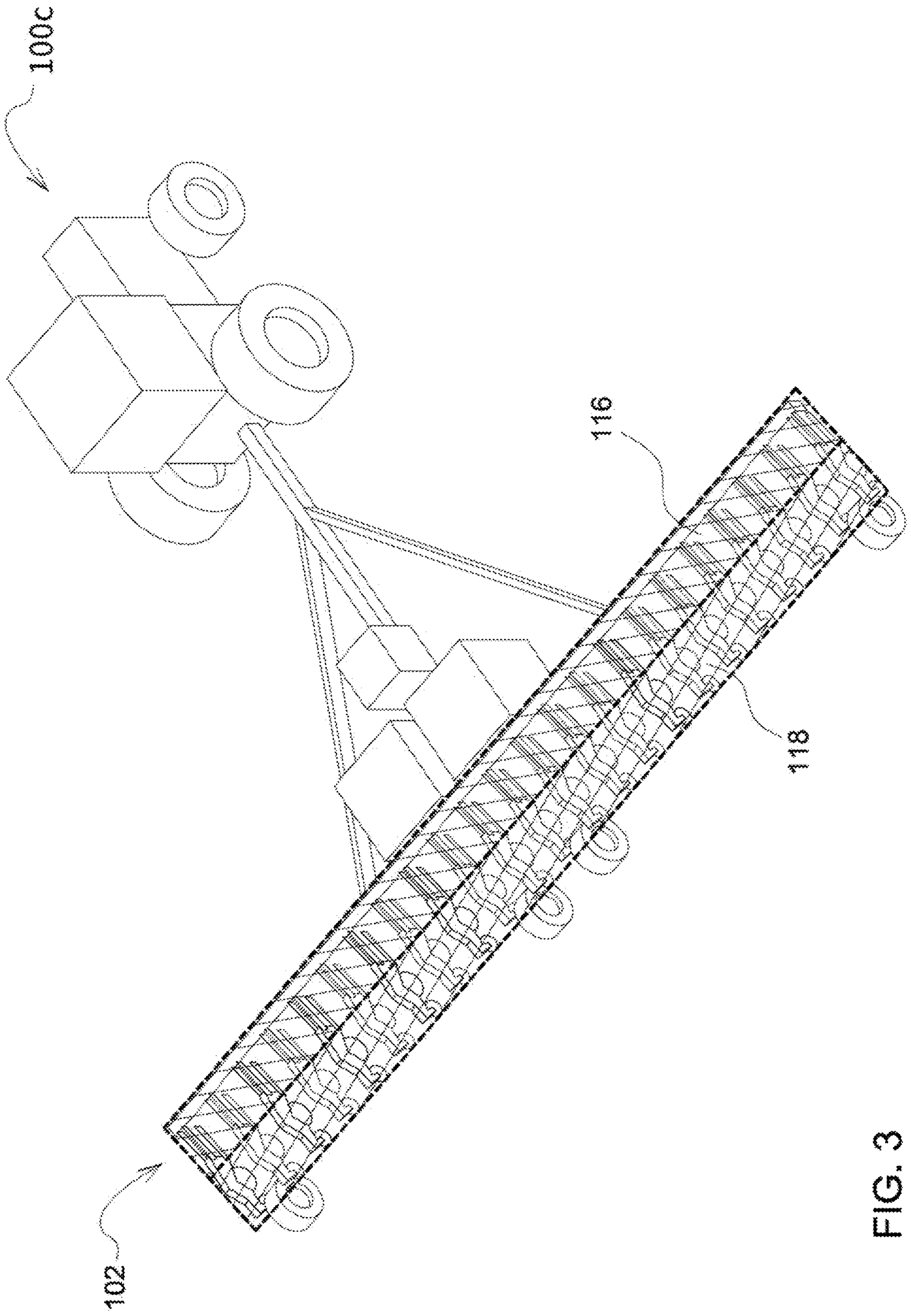
FIG. 3 is a perspective view representing an embodiment of a work machine and associated work implement for planting operations.
Figure 4:
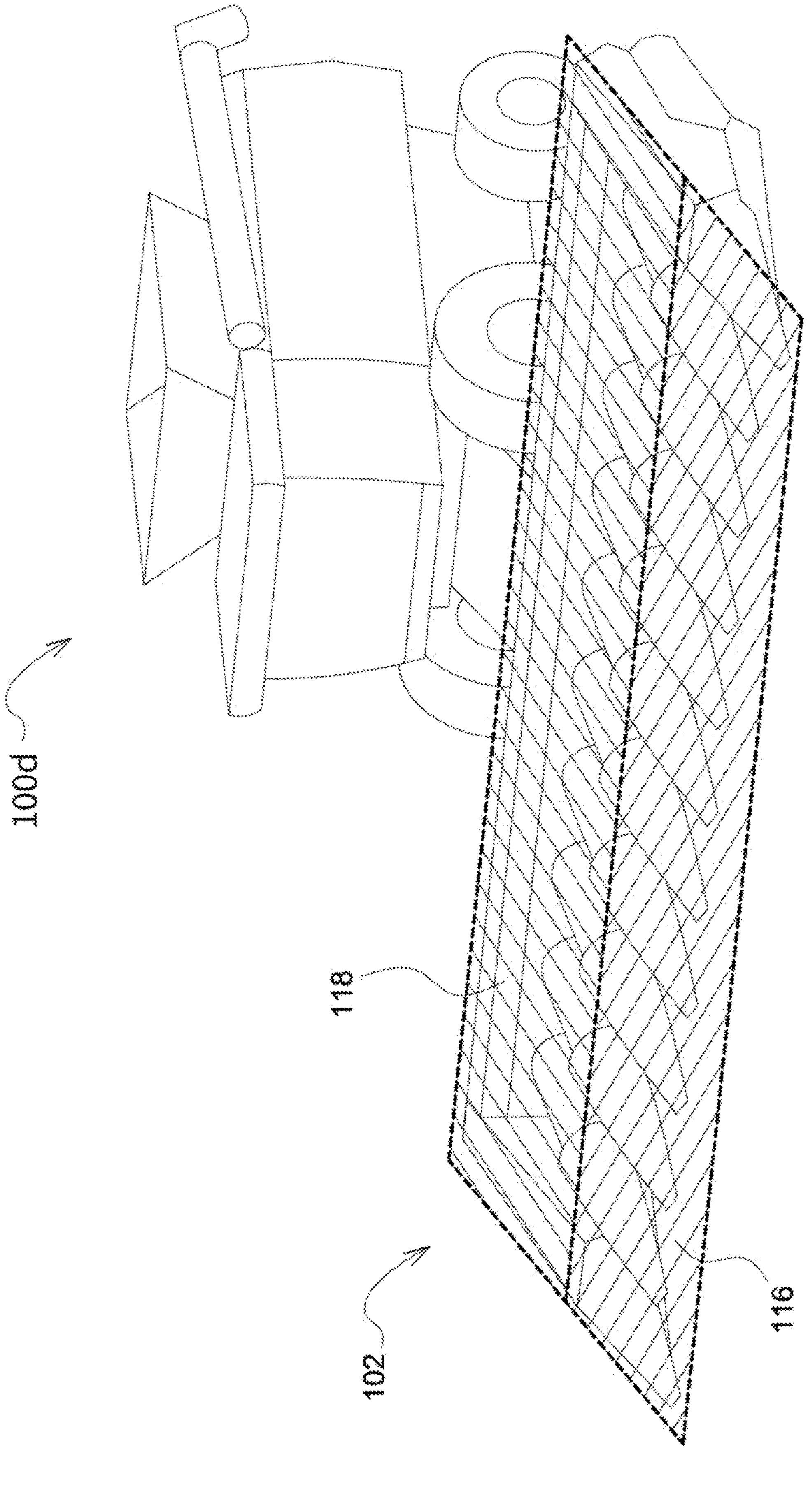
FIG. 4 is a perspective view representing an embodiment of a work machine and associated work implement for harvesting operations.
Figure 5:
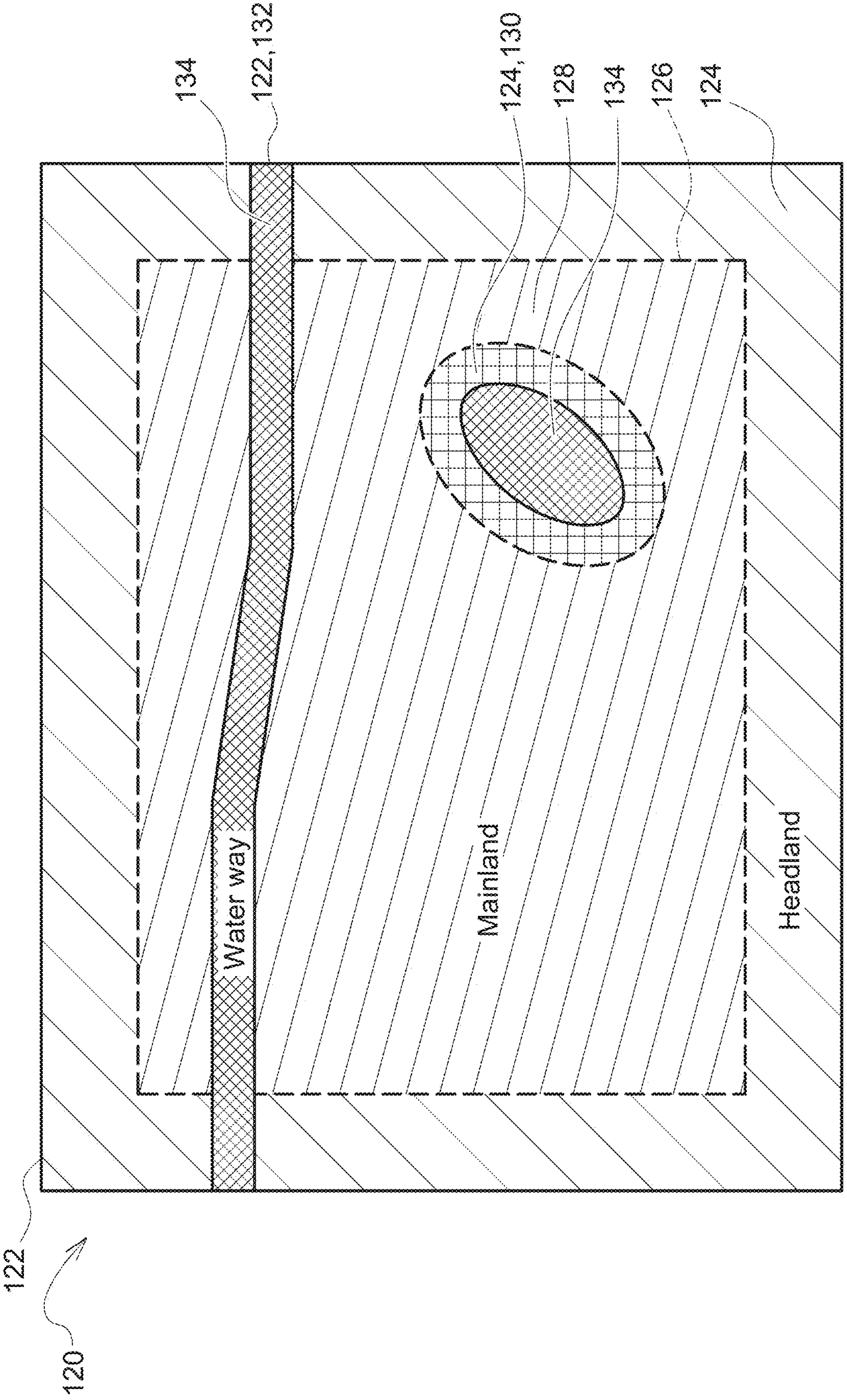
FIG. 5 is an overhead view representing an exemplary work area and associated constraints mapped thereto.
Figure 6:
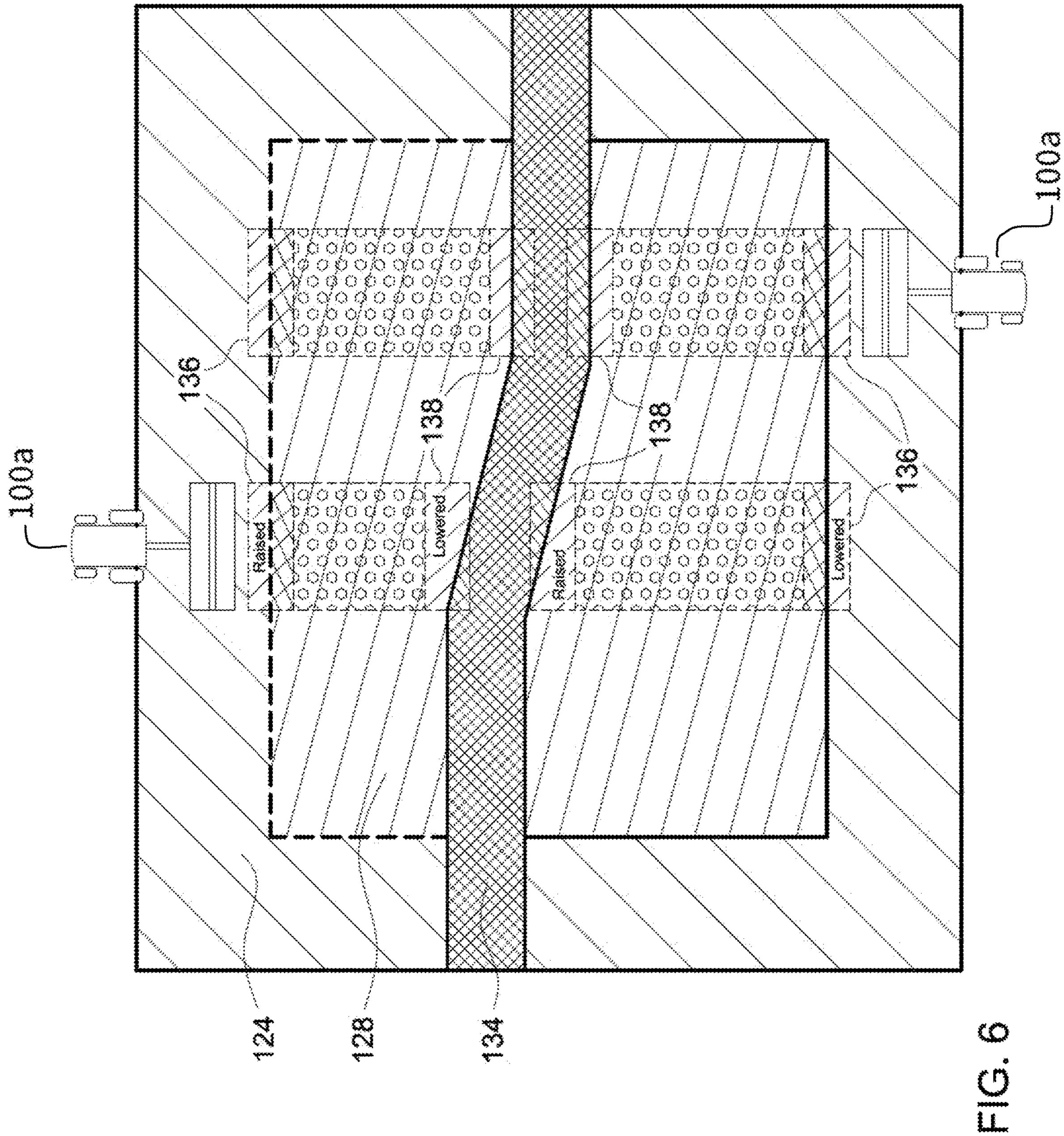
FIG. 6 is an overhead view representing partial work issues according to conventional techniques for operating in an exemplary work area.
Figure 7:
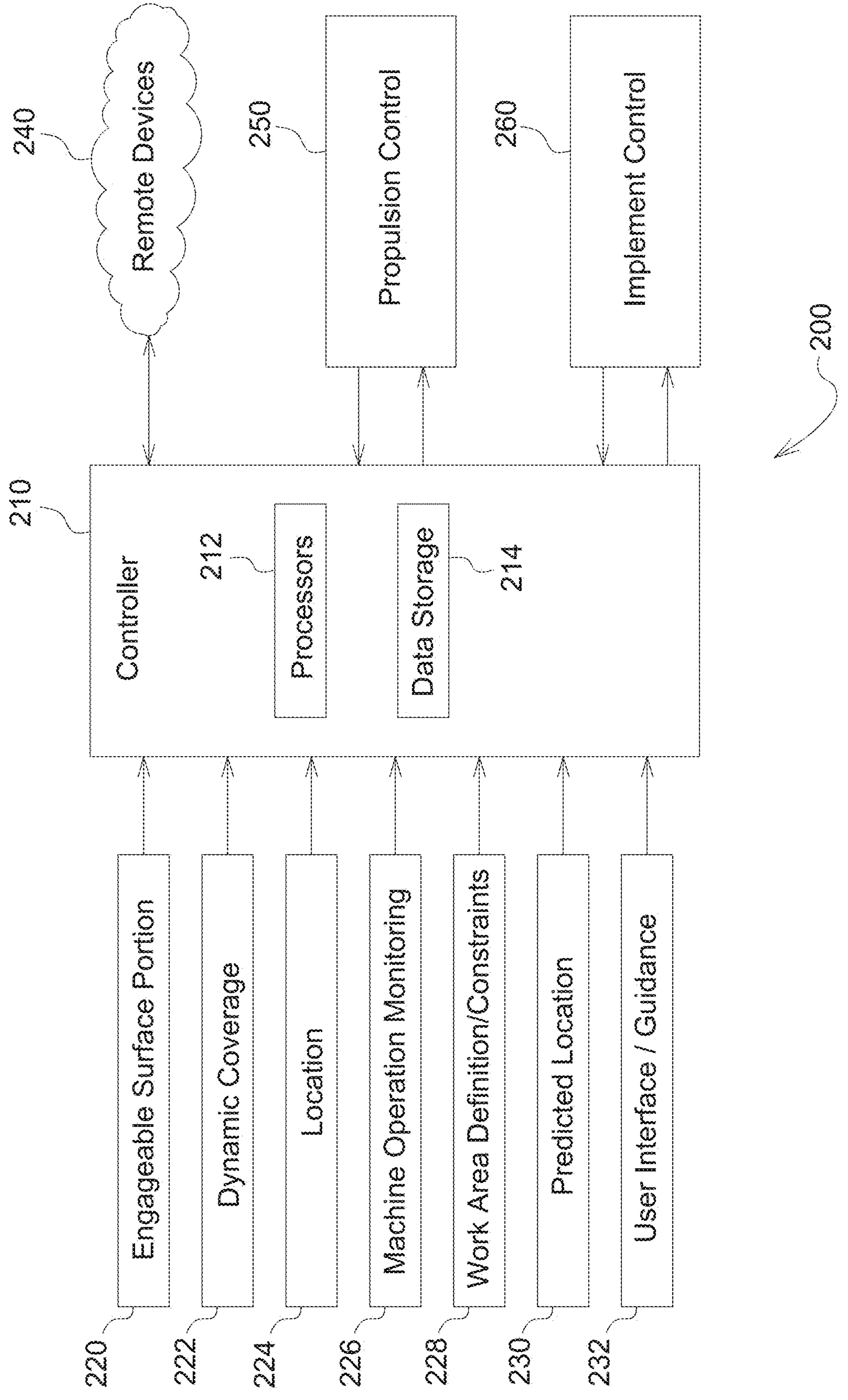
FIG. 7 is a block diagram representing an embodiment of a control system according to the present disclosure.

FIG. 7 in a particular embodiment as disclosed herein shows a system 200 for automatic engagement control for at least one work implement assembly associated with a work machine. As previously described with respect to FIGS. 1A-4, the work machine 100 may include a work vehicle towing, pushing, or otherwise having integrated therewith at least one work implement assembly 102 for use in a work area.

The exemplary system 200 of FIG. 7 includes a controller 210 having integrated therein or otherwise functionally linked with a propulsion (e.g., engine speed) control unit 250 and an implement assembly control unit 260. Such control units and respective functions, among others, may be discrete in nature or otherwise combined in various embodiments without departing in any way from the scope of the present disclosure.

In one embodiment, wherein the work machine is a planter, an implement assembly control unit 260 may comprise or otherwise be functionally linked to one or more actuators configured to adjust the downward force of ground working tools associated with the work implement assembly against the soil. To increase the downward force in excess of the row unit weight, or to be able to adjust the force, hydraulic and/or pneumatic actuators (and/or one or more springs) can be added to urge the ground working tools downwardly with a controllable force. The one or more actuators may also be used to lift the ground working tools off the ground for transport or to maintain seed depth by adjusting downforce to account for variations in soil density. It may be understood that for other embodiments of the work machine and corresponding work implement assemblies, the components for actuation thereof may vary accordingly and in a manner understood by one of skill in the art.

The controller 210 may generate output signals corresponding to display and/or automatic control of various operations of the work machine, based on any one or more of various input parameters including but not limited to those labeled as 220-232 in FIG. 7. In some embodiments within the scope of the present disclosure, displayed and/or automatically controlled settings or operations for one or more components of the work machine are not limited to the engagement/disengagement functions as otherwise described herein, but may further include additional and internal processes performed based on an operating mode, or changes to the operating mode, for example based on geospatially defined parameters. For example, various internal components of the work machine, independent of components which are involved in engagement or disengagement with the work area, may further be automatically controlled with respect to ingested material such as separating, cleaning, and chopping, and the like, wherein these control functions (and/or related display functions) may be enabled or disabled based on entry into or exit from defined areas (e.g., crop zones, prior coverage, waterways) alongside operating mode changes otherwise corresponding to engagement/independent. In some embodiments it maybe contemplated that changes in operating modes may be defined which change internal control settings while maintaining an engagement or disengagement function as otherwise described herein, for example based on geospatial triggers.

An engageable surface portion 220 for the work implement assembly may be defined based on the working length and working width thereof. In some embodiments, an engageable surface portion 220 for the work implement assembly may be defined based on a working depth thereof, wherein a three-dimensional surface volume is considered instead of a two-dimensional surface area. In contrast to a simple rectangular surface area corresponding to a working length and a working width for the work implement assembly, in some embodiments the work implement assembly may define an angled complex polygon, for example in the context of a road grader blade being angled with respect to the plane of the unprocessed ground surface. Accordingly, an engageable surface portion within the scope of the present disclosure may account for a multidimensional aspect of the work implement assembly, wherein the number of dimensions involved and the relevant parameters may be dependent on the present structure, working operation, etc.

A dynamic coverage map 222 may enable boundaries to be dynamically redefined based on coverage by the work implement assembly during a current working operation, for example to denote new boundaries which can be traversed but are not desirably engaged again by the work implement assembly. The dynamic coverage map may further account for other dynamic features of the work area.

Location data 224 may be provided using any of various known techniques for determining a location of the work machine, for example including global navigation system sensors (GNSS). Location data may also relate to the relative positioning of the work implement assembly with respect to a main frame of a work vehicle, and/or with respect to detected obstacles, as may be provided using vehicle speed sensors, ultrasonic sensors, laser scanners, radar wave transmitters and receivers, thermal sensors, imaging devices, structured light sensors, and other optical sensors, wherein exemplary imaging devices may include a digital (CCD/CMOS) camera, an infrared camera, a stereoscopic camera, a time-of-flight/depth sensing camera, high resolution light detection and ranging (LiDAR) scanners, radar detectors, laser scanners, and the like within the scope of the present disclosure.

Machine operation data 226 may include measured current operation values such as for example advance speed of the work machine, parameters relating to performance of the work implement assembly such as a planting depth, current machine settings such as target values, and the like.

Work area definitions and constraints 228 may be initially provided based on mapped physical characteristics (e.g., boundaries, waterways) corresponding to the work area, and determined work area constraints based for example on inputs or rules for defining the various physical characteristics as being passable, non-passable, headlands to be worked or not worked, etc. Exemplary physical characteristics and associated constraints, in addition to an exterior boundary, may include any other boundaries associated with an obstacle, obstruction, hazard, safety condition, or another condition that requires the work machine to raise and/or lower the work implement assembly, turn on/off treatments provided thereby, or even depart from the planned path, stop movement, or take evasive measures which may generally represent a planned or unplanned intermission in an otherwise planned or desired working operation. Work area definitions and constraints may be defined in part via user input, sensed in real time using one or more sensors, retrieved from data storage based on previously surveyed and/or mapped work area data, plans, and the like. A user interface 232 may be configured to receive the user input for defining a work area such as for example including exterior field boundaries and interior headland boundaries and regions, wherein additional interior regions may be determined based on real time conditions such as for example a newly detected obstacle, a larger or smaller waterway than expected, etc., as well as in various embodiments prior coverage within the work area.

Future predicted locations 230 may be calculated using a predictive model and based on various inputs such as a work plan, current machine operating settings, and the like, and may further coordinate with models or algorithms for predicting engageable surface portions during a working operation and corresponding traverse of the field.

The controller 210 may be configured to produce outputs, as further described below, to a user interface 232 associated with a display unit for display to the human operator. The controller may be configured additionally or in the alternative to produce outputs to a display unit independent of the user interface and linked to a remote device 240 such as for example a mobile user device associated with the operator, a display unit functionally linked to one or more remote servers, one or more other work machines, etc. The controller may be configured to receive inputs from the user interface, such as user input provided via the user interface. The controller may in some embodiments further receive inputs from the remote user devices, servers, and/or other work machines via respective user interface, for example a display unit with touchscreen interface. Data transmission between, for example, the controller and a remote user interface may take the form of a wireless communications network and associated components as are conventionally known in the art.

Although not specifically noted in FIG. 7, further rules and/or equipment information may be stored in data storage 214 and accessible by the controller 210 for performing various calculations during operation. For example, a digital model of the work implement assembly or an equivalent may be used to determine the engageable surface portion. The digital model, or other models developed over time based for example on monitored performance of the work implement assembly control responsive to commands, may include information to be used for calculating system delays in engagement and/or disengagement responsive to such commands. Overlap rules may be stored, for example in response to user specification or for a particular type of work application, defining hit test characteristics for a given operating mode.

The controller 210 may generate control signals for any or all of the propulsion control unit 250, the work implement assembly control unit 260, and/or any other component or system that is/are consistent with work machine operations, and subject to modification or interruption by the control system 200 or another system. For example, control signals may comprise a steering control signal or data message that defines a steering angle of the steering shaft, a braking control signal or data message that defines the amount of deceleration, hydraulic pressure, or braking friction to the applied to brakes, a propulsion control signal or data message that controls a throttle setting, a fuel flow, a fuel injection system, vehicular speed or vehicular acceleration. Further, where a work vehicle of the work machine may be propelled by an electric drive or electric motor, the propulsion control signal may control or modulate electrical energy, electrical current, electrical voltage provided to an electric drive or motor. The control signals generally vary with time as necessary to track the path plan. The lines that interconnect the components of the system 200 may comprise logical communication paths, physical communication paths, or both. Logical communication paths may comprise communications or links between software modules, instructions or data, whereas physical communication paths may comprise transmission lines, data buses, or communication channels, to name non-limiting examples.

The controller 210 may for example include or be associated with one or more processors 212, and data storage 214 such as for example may include a database network. It may be understood that the controller described herein may be a single controller having all of the described functionality, such as for example being part of a central vehicle control unit, or it may include multiple controllers wherein the described functionality is distributed among the multiple controllers.

Various operations, steps or algorithms as described in connection with the controller 210 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 212 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Figure 8:
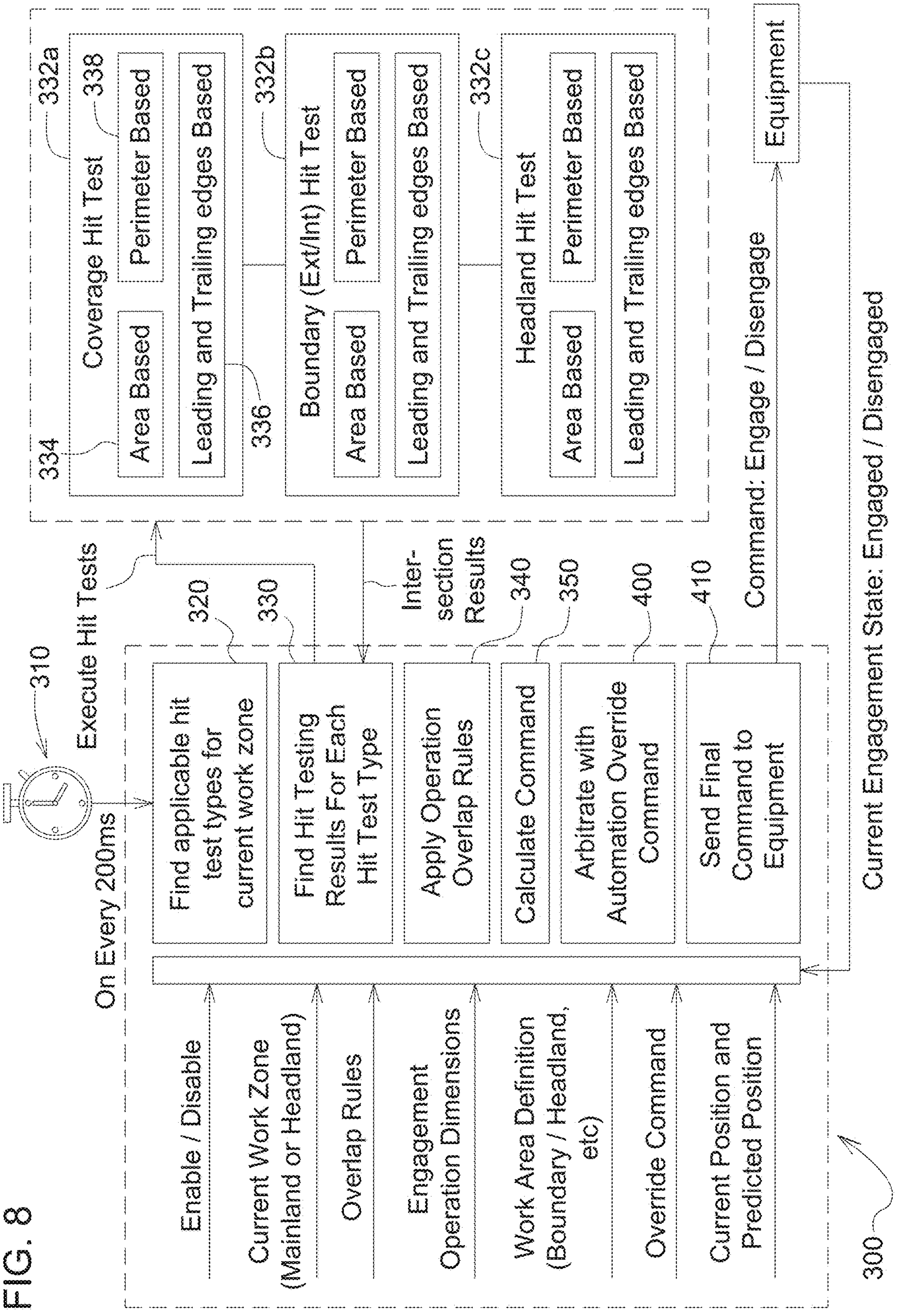
FIG. 8 is a flow diagram representing an exemplary method according to an embodiment of the present disclosure.
Figure 9:
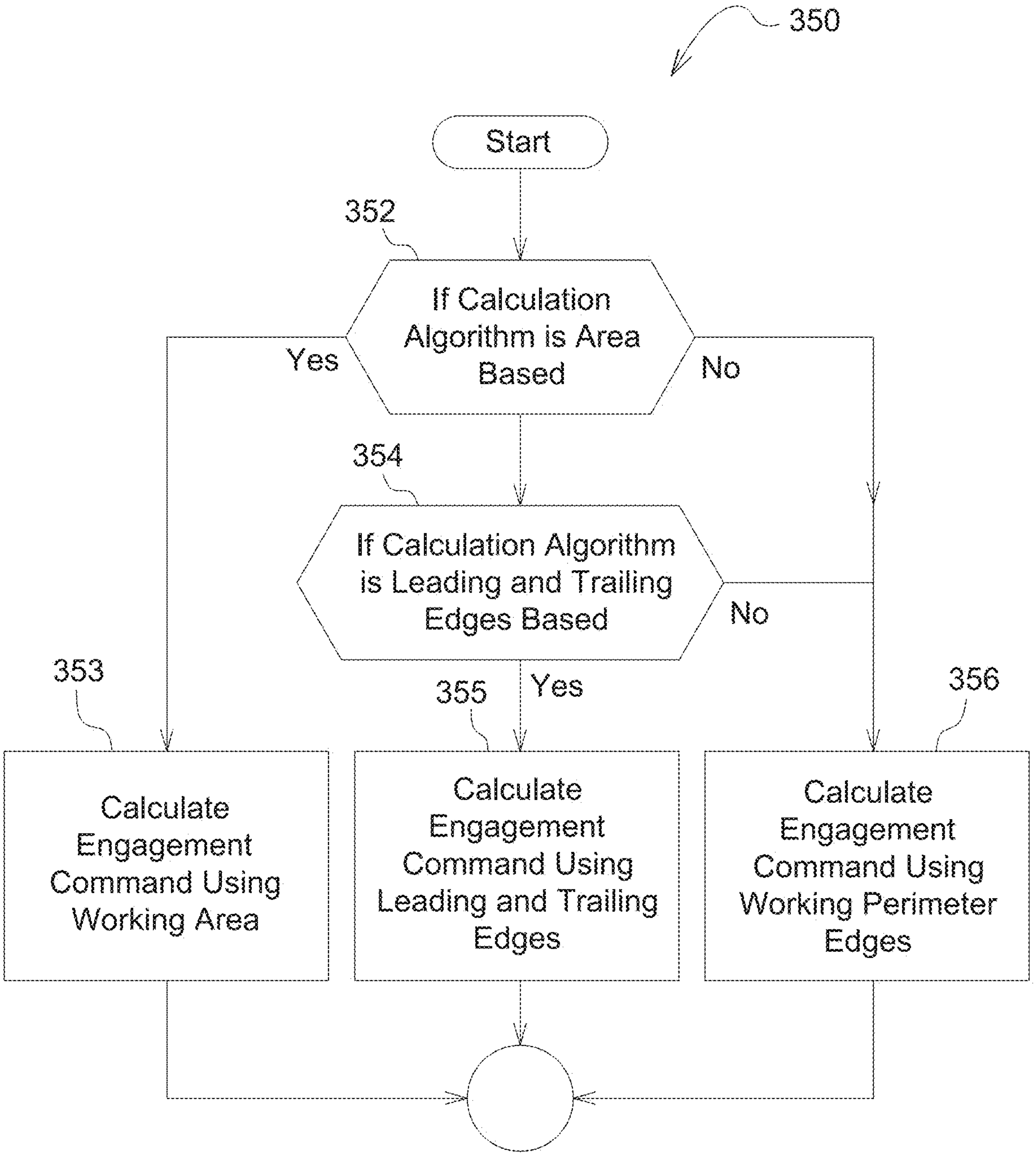
FIG. 9 is a flow diagram representing an exemplary detail with respect to part of the method of FIG. 8.

Referring now to FIG. 8, an embodiment of an engagement control method 300 according to the present disclosure may be described.

For illustrative purposes, but not limiting on the scope of the systems and methods disclosed herein unless otherwise specifically noted, FIG. 8 will be described in the context of a system 200, work machine 100, work implement assembly 102, and the like as illustrated in FIGS. 1A-4 and 7.

While the illustrated embodiment may include a specific arrangement of steps, inputs, outputs, and the like, it may be understood that certain steps may be combined, performed in a different order, or even omitted altogether in other embodiments within the scope of the present disclosure, unless otherwise specifically noted herein.

The method 300 may initiate in step 310, for example to be performed in a continuous loop for each of successive time frames, such as every 200 milliseconds.

The illustrated embodiment of method 300 further includes a step 320 of determining applicable hit test types for a current work zone, and further a step 330 of determining hit testing results for each applicable hit test type.

The work zone may generally relate to a predicted engageable surface portion, based for example on the geometry (e.g., working length and working width) of the work implement assembly, further in view of a trajectory and advance speed of the work machine, and further in some embodiments in view of an estimated time- or distance-based delay between initiation of commands to engage (where the work implement assembly is presently disengaged) or to disengage (where the work implement assembly is presently engaged) and actual execution of the respective function.

An estimated delay may be based on a predetermined (e.g., manually provided) setting, or in some embodiments algorithms/models may be iteratively generated over time and retrievably stored in data storage to correlate inputs comprising initiation of engagement/disengagement commands and associated sets of work conditions with respect to outputs comprising determined actual delays. An estimated delay for a current command may be determined by reference to the algorithm, and a determined actual delay after the current command is provided as feedback for continued development of the algorithm in the data storage. Automatic generation of the estimated delays may in such embodiments be further implemented for example upon selection of an automatic mode and subsequent to predicted estimated delays with respect to determined actual delays satisfying a specified figure of merit for the algorithm, or other equivalent process for verification that the algorithm is sufficiently trained.

One of skill in the art may appreciate that system delays in implementation of a command (e.g., for engagement or disengagement) may stem from mechanical delay, electrical delay, communication delay, or other pertinent delay sources. In various embodiments, delay data may be predefined and available for use, for example via one or more data structures that map different tools to different system delay times. As one example, a planter that takes five seconds to lower into a planting site may indicate a system delay of five seconds. As another example, a sprayer that takes half of one second to activate (e.g., to move a nozzle from a closed to an open position) would have an indication in the data structure of a system delay of half of one second. In an embodiment, there may be many different system delays (e.g., delays relating to raising or lowering a tool, delays relating to starting and stopping dispensing, etc.), and the delays in the aggregate may be accounted for in determining an initial delay time.

Applicable hit test types 332 may be determinable from a map of the work area, for example relating to physical characteristics such as waterways, as well as other inputs defining boundaries, prior coverage, and the like. Exemplary hit test types may accordingly include a coverage hit test **332*a*, a boundary (e.g., exterior, interior passable, interior impassable) hit test 332*b*, a headland hit test 332*c*, and the like. For each of the various hit test types, a given hit test may for example further be performed according to a calculation algorithm which is area-based 334, leading and trailing edge based 336, or perimeter based 338**.

Having obtained hit test results corresponding to the applicable hit test type for a current work zone, the method 300 may further include applying overlap rules for a current work operation 340 and calculating a command 350 based on the overlap rules as applied to the hit test results. Generally stated, overlap rules (e.g., settings) are used when a working area (or one or more edges depending on the operating mode) intersects with a data geometry corresponding to the direction of travel. Overlap rules may comprise both inline and lateral overlap.

In an embodiment, a zero percent overlap rule may be configured to ensure disengagement of the equipment with respect to, e.g., any previously covered area, areas beyond exterior boundaries, to disengage the equipment just before traversing, or otherwise entering an area within, an interior boundary. Accordingly, equipment may for example be disengaged before entering a designated data area, kept disengaged while inside the data area, and only engaged after completely outside of the data area. This may result in under application and/or maximize skips in operation with respect to some areas that are otherwise desirably engaged/treated, but may be preferable in applications where it is most important to entirely avoid any operation with respect to certain defined provided data geometries.

In an embodiment, a one hundred percent overlap rule may be configured to ensure engagement of the equipment with respect to field boundaries, interior boundaries, and previous covered areas to effectively reduce skips in operation. Accordingly, equipment may for example be engaged before entering a designated data area, keep engaged while inside the data area and further after completely out of the data area. This can typically result in over application with respect to areas that are otherwise avoided, but may be preferable in applications where it is most important to completely cover/treat all areas inside of provided data geometries.

One of skill in the art may appreciate of course that various additional and alternative overlap rules may be available, somewhere within the zero percent and the one hundred percent operating modes, and in various embodiments customizable in response to user input. Application of the zero percent and one hundred percent operating modes may further vary according to an operation type (e.g., tillage, planting, combine), a type of work zone (e.g., mainland, headland, exterior boundary), and the like.

Referring to FIGS. 9-12, an embodiment of a process corresponding to the step 350 for calculating a command may be further described.

If a calculation algorithm for the given hit test is area-based (i.e., "yes" according to the query 352), an engagement command is accordingly calculated in step 353 using the predicted location of the working area of the work implement assembly and a corresponding engageable surface portion.

Figure 13B:
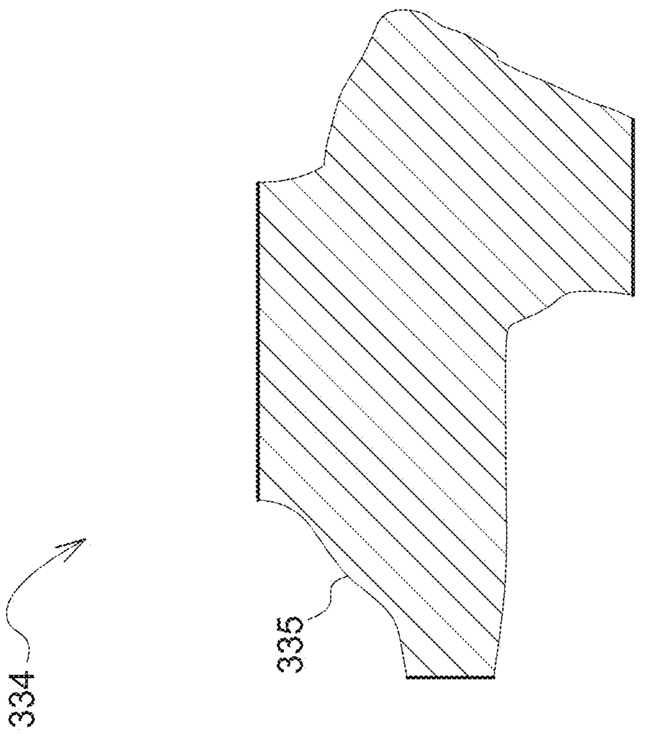
FIGS. 13A and 13B are diagrams representing, respectively, a predicted position of an engageable surface portion relative to a constraint within a work area, and an associated area-based hit test result.
Figure 13A:
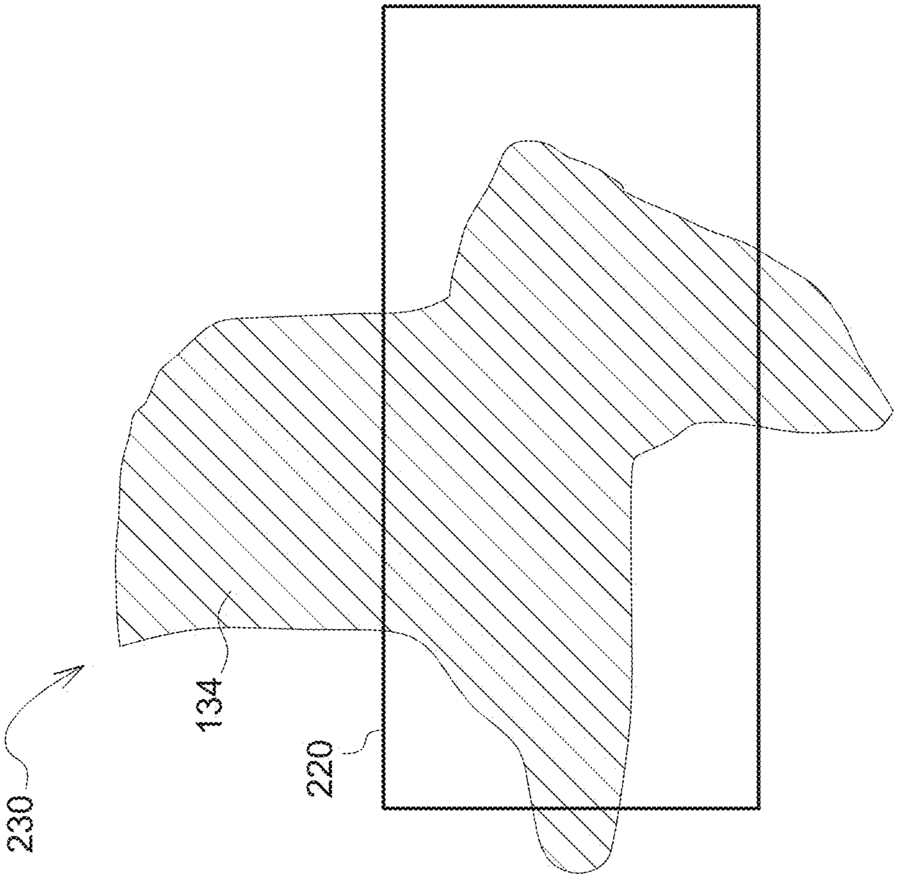

An example of this working area based calculation algorithm 334 is illustrated in FIGS. 13A and 13B. In FIG. 13A, a predicted location 230 for the work implement assembly comprises an overlap of an engageable surface portion 220 with a waterway 134. FIG. 13B illustrates an overlap area 335 associated with each of the engageable surface portion and the waterway for the predicted location. If a current operating mode for the operation specifies an overlap rule wherein nothing above zero percent overlap of constraints in the overlap area 335 is permitted, the corresponding engagement command would be to disengage. If a current operating mode for the operation specifies an overlap rule wherein anything less than one hundred percent overlap of constraints in the overlap area 335 is permitted, the corresponding engagement command would be to engage. It may be understood that various additional operating modes are within the scope of the present disclosure, wherein for example the command may be further dependent on a determined overlap of the working area with other types of constraints.

If a calculation algorithm for the given hit test is leading and trailing edge based (i.e., "yes" according to the query 354 in FIG. 9), an engagement command is accordingly calculated in step 355 using the predicted locations of the leading and trailing edges of the work implement assembly and a corresponding engageable surface portion.

Figure 14B:
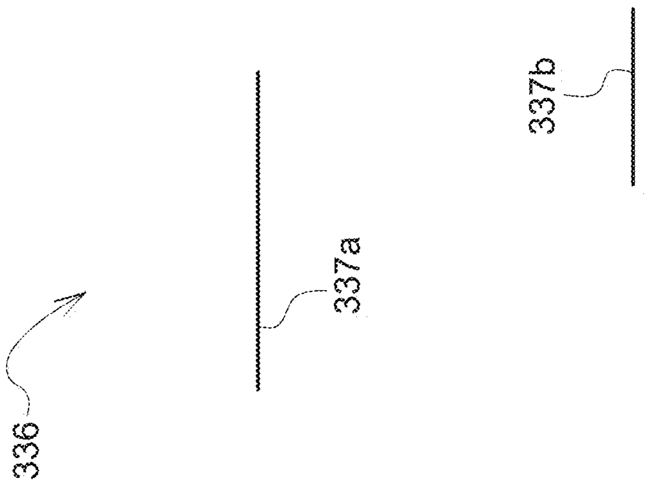
FIGS. 14A and 14B are diagrams representing, respectively, a predicted position of an engageable surface portion relative to a constraint within a work area, and an associated leading- and trailing-edge-based hit test result.
Figure 14A:
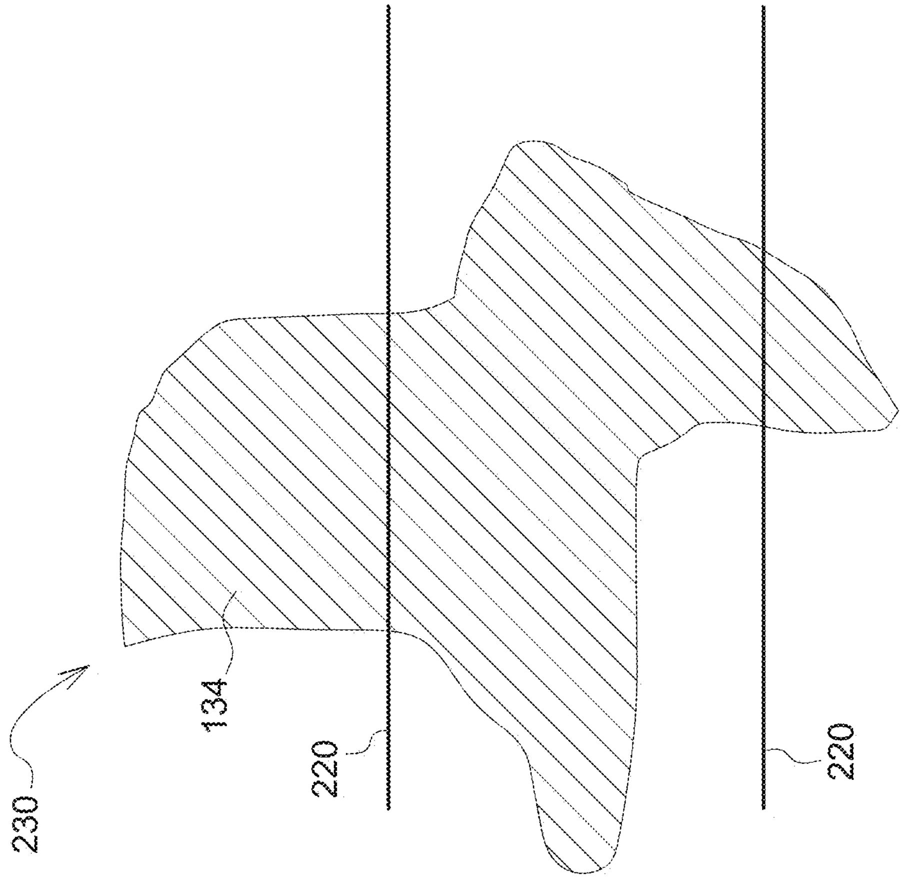

An example of this leading and trailing edge based calculation algorithm 336 is illustrated in FIGS. 14A and 14B. In FIG. 14A, a predicted location 230 for the work implement assembly comprises an overlap of the leading and trailing edges with an engageable surface portion 220 including a waterway 134. FIG. 13B illustrates an overlap of the leading edge 337*a* with respect to the engageable surface portion and the waterway for the predicted location, and an overlap of the trailing edge 337*b* with respect to the engageable surface portion and the waterway for the predicted location. If a current operating mode for the operation specifies an overlap rule wherein nothing above zero percent overlap of constraints with respect to the overlap edges 337*a*, 337*b* is permitted, the corresponding engagement command would be to disengage. If a current operating mode for the operation specifies an overlap rule wherein anything less than one hundred percent overlap of constraints with respect to the overlap edges 337*a*, 337*b* is permitted, the corresponding engagement command would be to engage. It may be understood that various additional operating modes are within the scope of the present disclosure, wherein for example the command may be further dependent on a determined overlap of the leading and/or trailing edges with other types of constraints.

If a calculation algorithm for the given hit test is perimeter based (i.e., "no" according to the queries 352 and 354 in FIG. 9), an engagement command is accordingly calculated in step 356 using the predicted locations of the perimeter of the work implement assembly and a corresponding engageable surface portion.

Figure 15B:
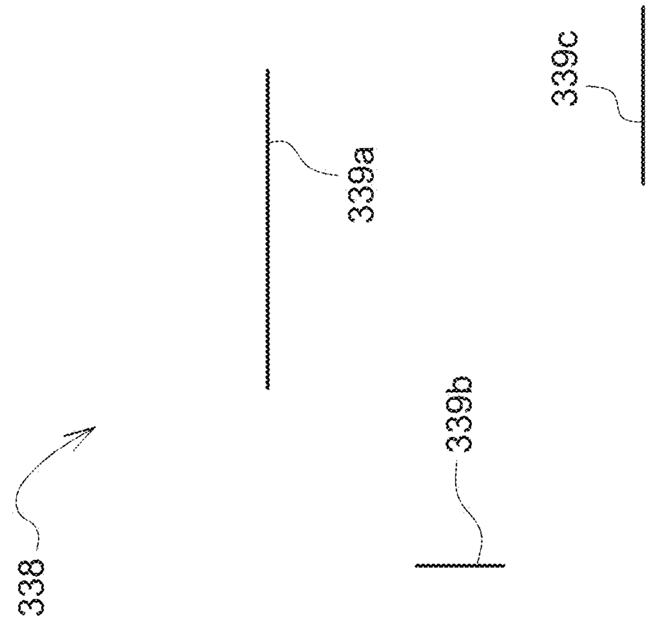
FIGS. 15A and 15B are diagrams representing, respectively, a predicted position of an engageable surface portion relative to a constraint within a work area, and an associated perimeter-based hit test result.
Figure 15A:
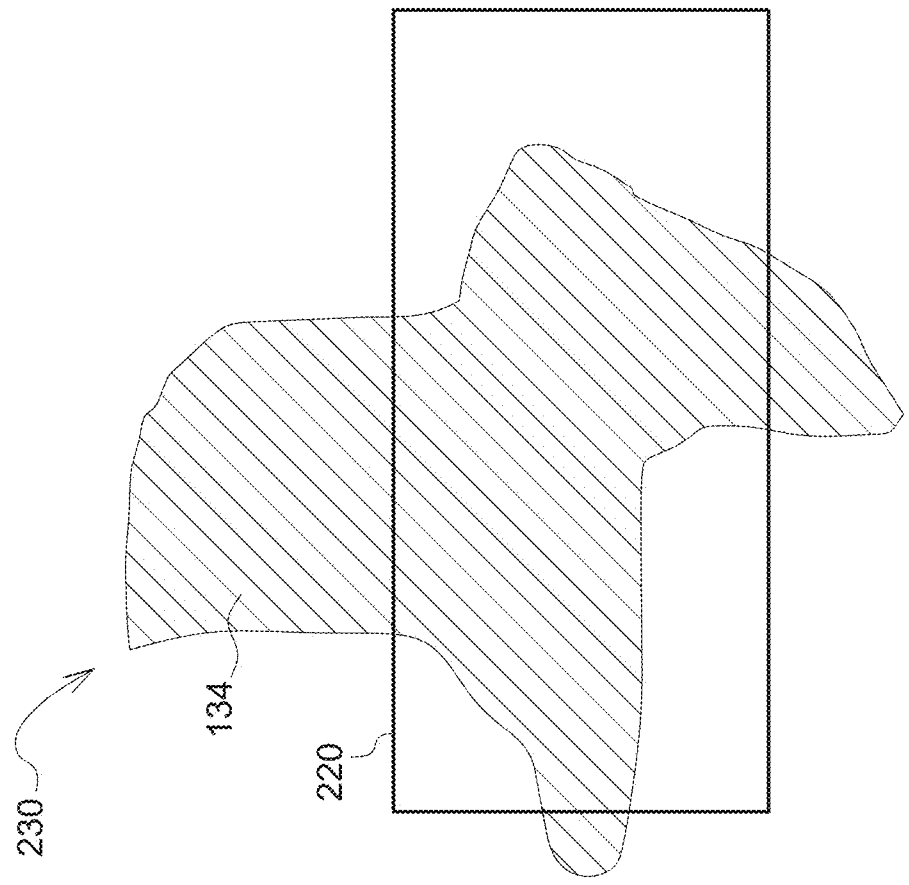

An example of this perimeter based calculation algorithm 338 is illustrated in FIGS. 15A and 15B. In FIG. 15A, a predicted location 230 for the work implement assembly comprises an overlap of the perimeter of an engageable surface portion 220 including a waterway 134. FIG. 15B illustrates an overlap of the perimeter on a top edge 339*a*, a left edge 339*b*, and a rear edge 339*c* with respect to the engageable surface portion and the waterway for the predicted location. If a current operating mode for the operation specifies an overlap rule wherein nothing above zero percent overlap of constraints with respect to the overlap edges is permitted, the corresponding engagement command would be to disengage. If a current operating mode for the operation specifies an overlap rule wherein anything less than one hundred percent overlap of constraints with respect to the overlap edges is permitted, the corresponding engagement command would be to engage. It may be understood that various additional operating modes are within the scope of the present disclosure, wherein for example the command may be further dependent on a determined overlap of some or all of the perimeter edges with other types of constraints.

While the algorithms in FIGS. 13A-15B relate to overlaps with waterways as a particular hit test type, which may for example be associated with an interior impassable boundary or other configuration as provided for a particular working operation or type of work machine, one of skill in the art may appreciate that the same calculation algorithms may apply in different manners with respect to other hit test types corresponding to prior coverage, exterior boundaries, interior passable boundaries, headland, or the like, each of which may also have respective overlap rules and/or parameters according to the particular working operation or type of work machine.

Figure 10:
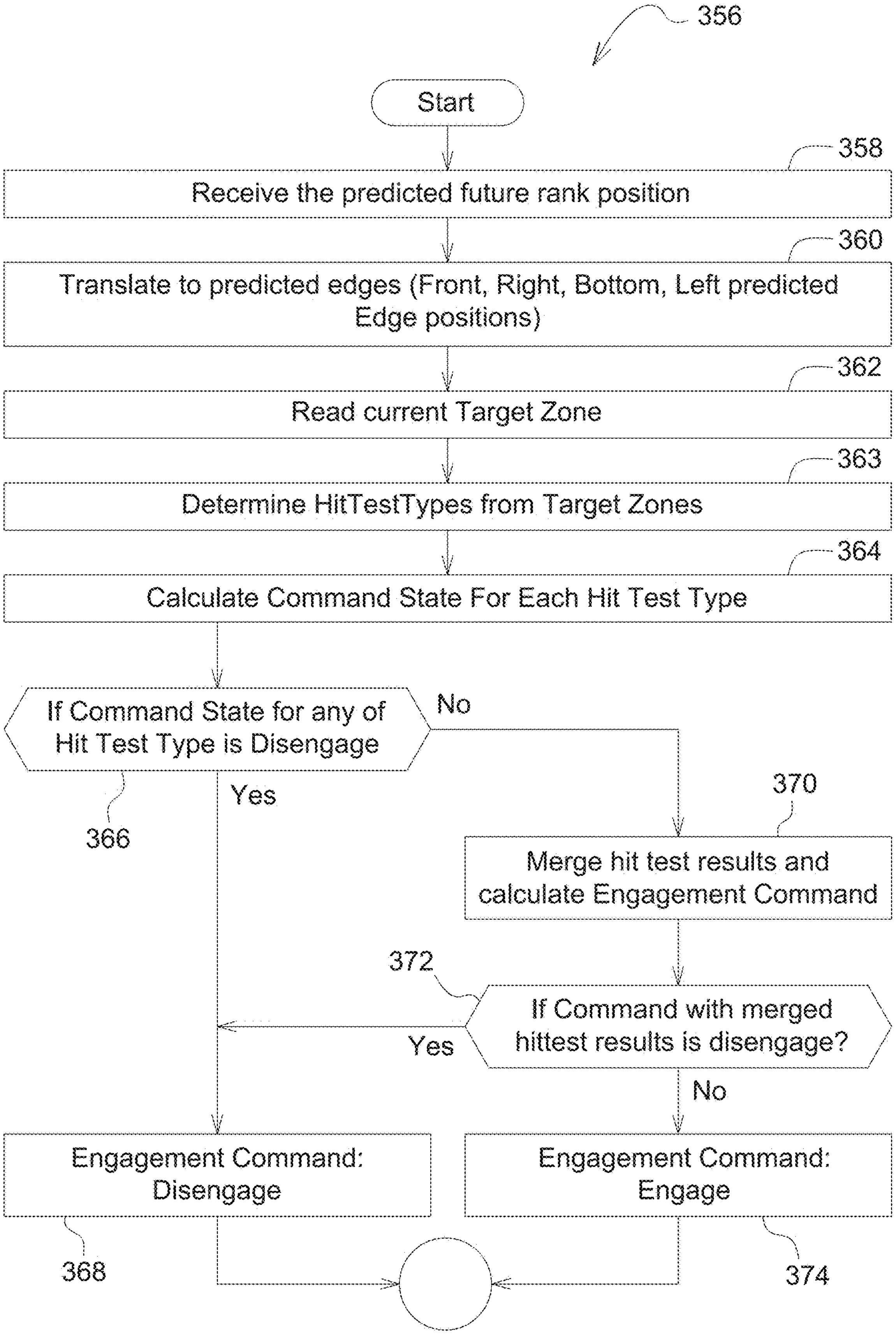
FIG. 10 is a flow diagram representing an exemplary detail with respect to part of the method of FIG. 9.

In an embodiment, generation of an engagement command according to the perimeter based calculation algorithm 356 may be performed according to a process as shown in FIG. 10. The controller receives or otherwise predicts a future rank position corresponding to the working area of the work implement assembly (step 358), and translates this information into predicted edges, such as for example the front, right, rear, and left predicted edge positions (step 360). The controller further determines a target zone at issue corresponding to an engageable surface portion to be traversed (step 362), determines hit test types to be analyzed based identified constraints within or otherwise associated with the target zone (step 363), and calculates a command state for each of the various hit test types (step 364).

If the command state for any of the hit test types is to disengage (i.e., "yes" in response to the query in step 366), the process continues to step 368 with a command to disengage (or maintain disengagement).

If the command state for none of the hit test types is to disengage (i.e., "no" in response to the query in step 366), the process continues in step 370 by merging hit test results and calculating an engagement command. If the command state after merger of the hit test results is to disengage (i.e., "yes" in response to the query in step 372), the process continues to step 368 with a command to disengage (or maintain disengagement). If the command state after merger of the hit test results is to engage, or otherwise stated not to disengage (i.e., "no" in response to the query in step 372), the process continues to step 374 with a command to engage (or maintain engagement).

Figure 11:
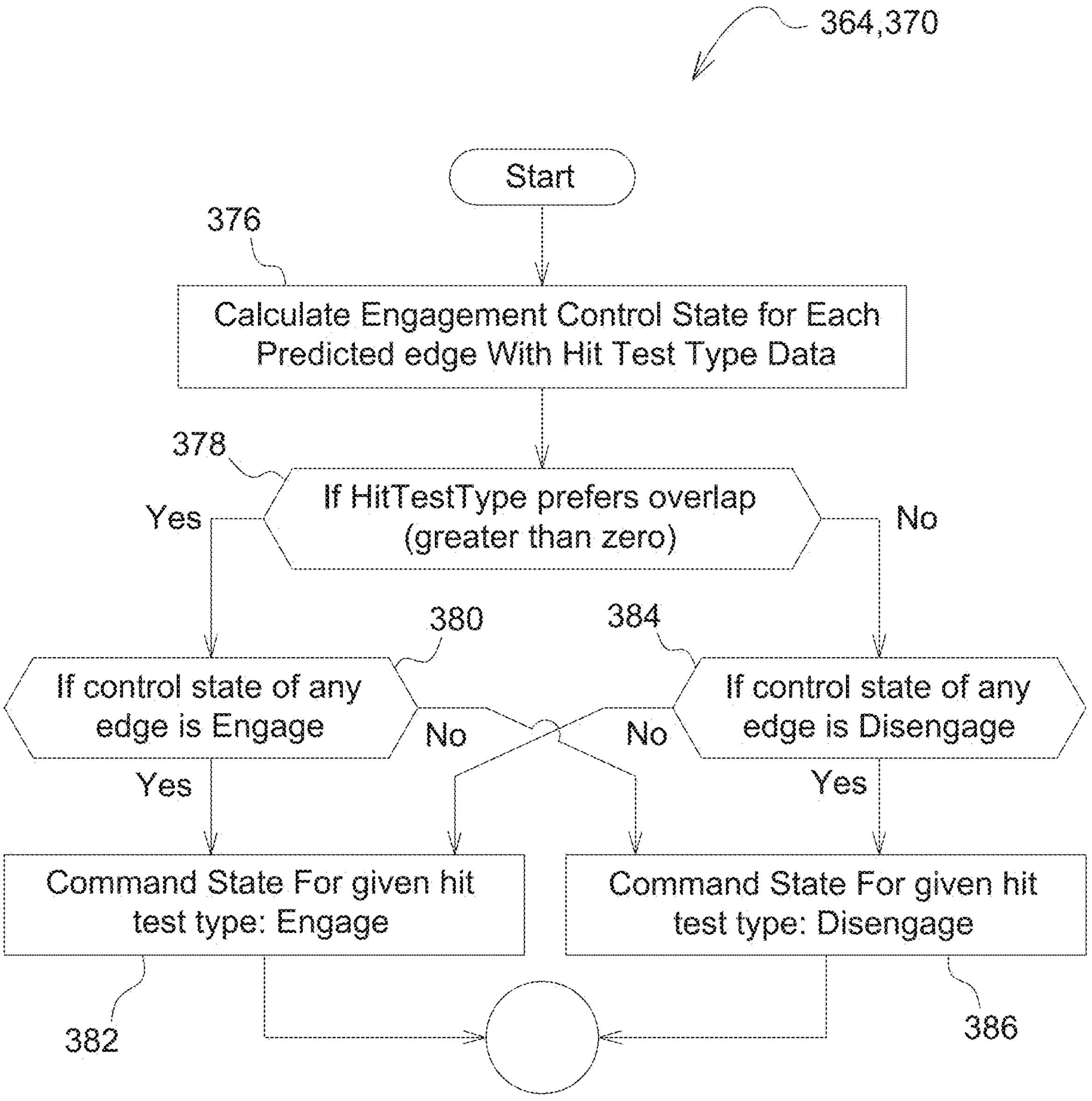
FIG. 11 is a flow diagram representing an exemplary detail with respect to part of the method of FIG. 10.

In an embodiment, determination of a command state 364 or calculation of an engagement command 370 may be performed as illustrated in FIG. 11. First, an engagement control state is calculated in step 376 for each predicted edge with hit test type data.

Figure 12:
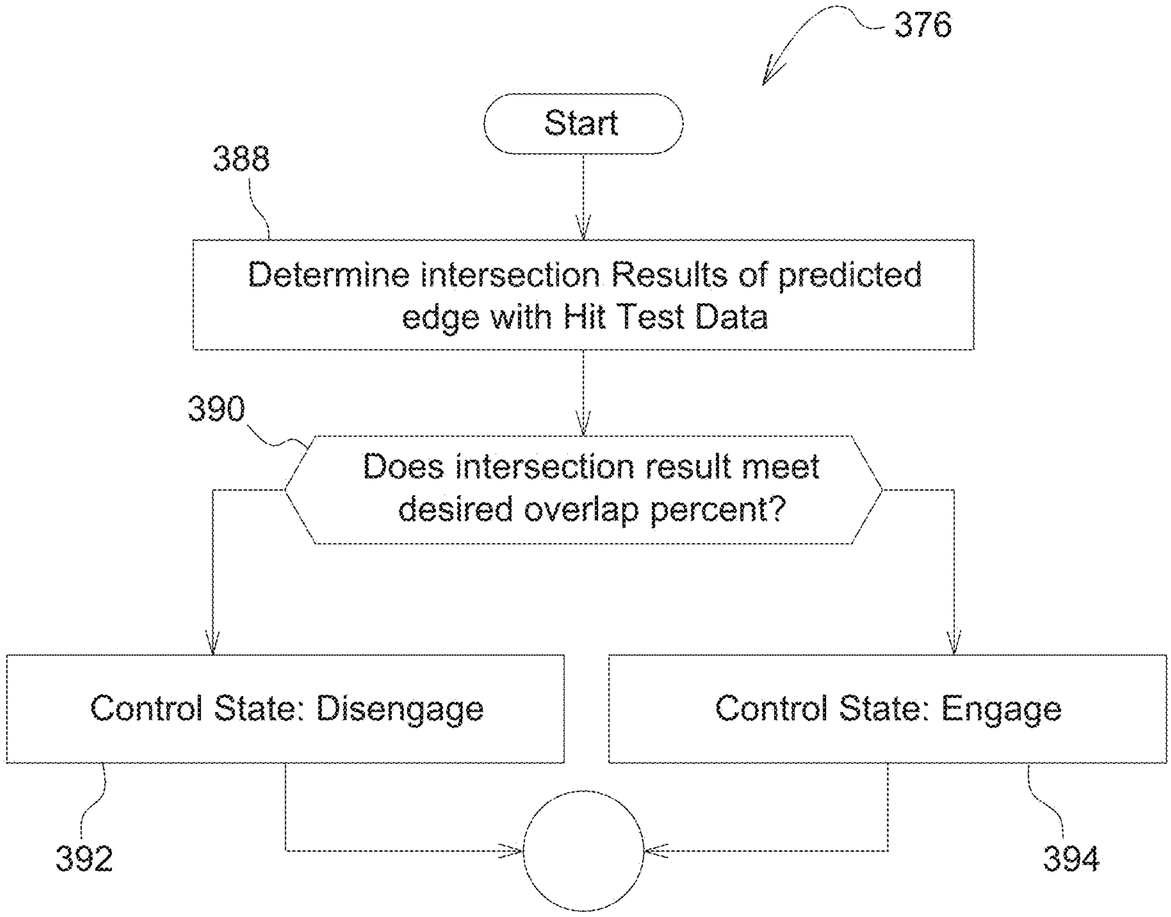
FIG. 12 is a flow diagram representing an exemplary detail with respect to part of the method of FIG. 11.

As referenced in FIG. 12 for example, and for each of the various predicted edges, this may include determining an intersection result of the respective predicted edge with the hit test data (step 388). Depending on whether or not the intersection result satisfies a desired overlap percentage (i.e., responsive to the query in step 390), the control state is set to disengage (step 392) or to engage (step 394).

Returning to FIG. 11, if the relevant overlap rule prefers overlap, or in other words allows for an overlap of more than zero percent for a constraint, or particular type of constraint, within the engageable surface portion (i.e., "yes" in response to the query in step 378), and if the control state of any edge is to engage (i.e., "yes" in response to the query in step 380), the command state for the given hit test type is set to engage (step 382).

If the relevant overlap rule does not prefer overlap, or in other words does not allow for an overlap of more than zero percent for a constraint, or particular type of constraint, within the engageable surface portion (i.e., "no" in response to the query in step 378), and if the control state of any edge is to disengage (i.e., "yes" in response to the query in step 384), the command state for the given hit test type is set to disengage (step 386).

Alternatively, if the relevant overlap rule allows for an overlap of more than zero percent for a constraint, or particular type of constraint, within the engageable surface portion (i.e., "yes" in response to the query in step 378), but the control state for none of the edges is determined to engage (i.e., "no" in response to the query in step 380), the command state for the given hit test type is set to disengage (step 386).

If the relevant overlap rule does not allow for an overlap of more than zero percent for a constraint, or particular type of constraint, within the engageable surface portion (i.e., "no" in response to the query in step 378), but the control state for none of the edges is determined to disengage (i.e., "no" in response to the query in step 384), the command state for the given hit test type is set to engage (step 382).

Returning now to FIG. 8, having calculated an engagement or disengagement command, the method 300 may continue in some embodiments by arbitrating the calculated command with an automation override command (step 400), where relevant. For example, in some cases such as where unusual turning or other operative maneuvers are called for, or responsive to a manual override command from the operator, the controller may be configured to override the engagement control command.

If the engagement control command is not overridden, the method 300 may include generating commands (in step 410) to one or more actuators associated with the work machine, and more particularly in most contexts associated with the work implement assembly, to execute the desired engagement/disengagement.

Figure 16A:
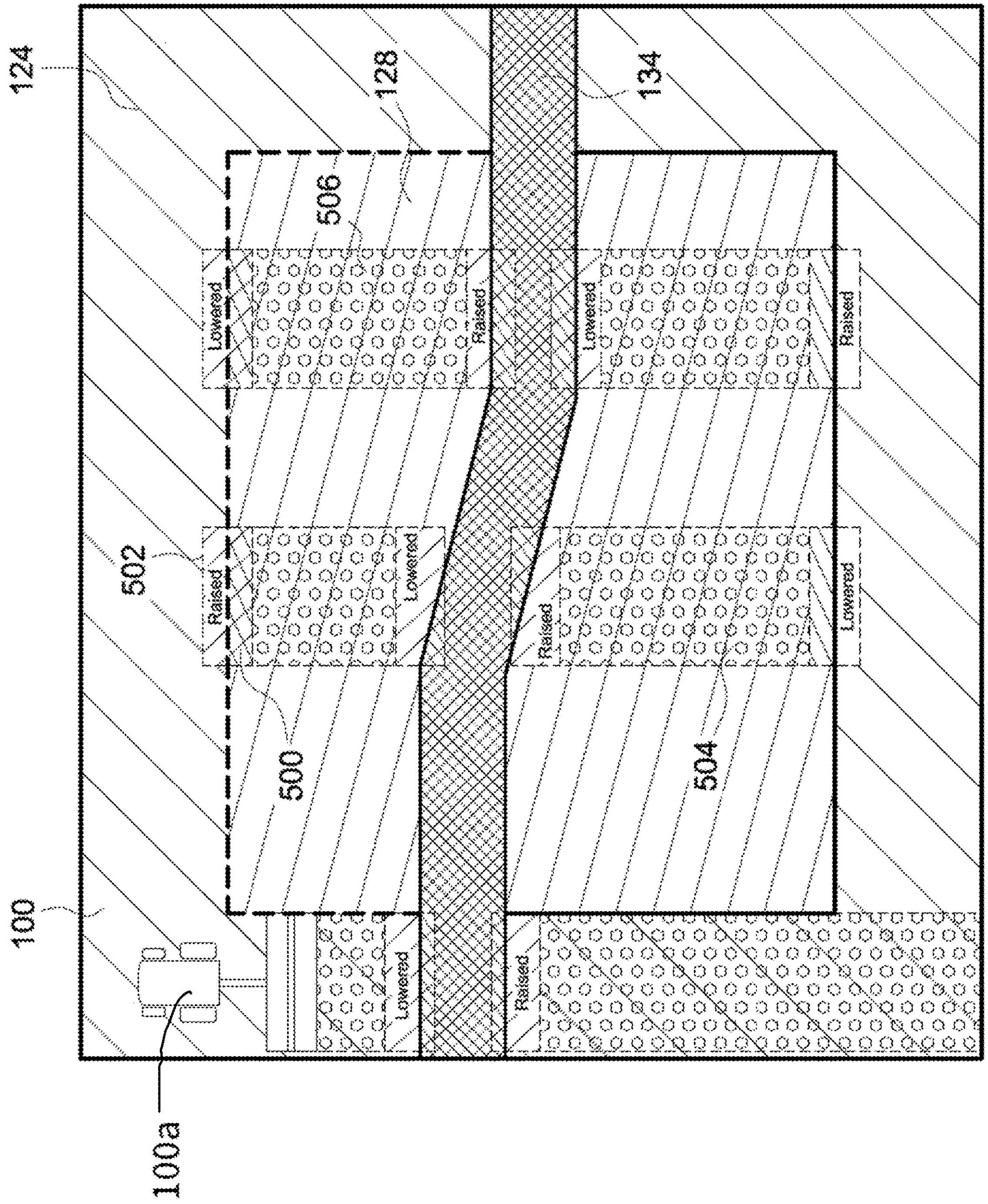
FIGS. 16A and 16B are overhead diagrams representing an exemplary tillage use case, based on conventional applications and on usage of a system and method according to the present disclosure, respectively.

An exemplary use case for a system and method as disclosed herein may further be described by reference to FIGS. 16A and 16B, and in the context of a tillage operation by a work machine 100*a*. In this type of operation, exemplary objectives may include to avoid tilling in waterways 134 or equivalent areas across interior passable boundaries, to avoid partially tilling in the mainland 128 during headland turns, to keep the work implement assembly lowered to work inside the headland 124, and to raise the work implement assembly during maneuvers such as sharp turns, backup, transition, etc.

Conventional techniques may typically fail to account for the entire working length of the work implement assembly, wherein the whole frame was frequently raised or lowered prematurely or otherwise at the wrong spot, causing either incomplete work or work where it was undesired (in this case, potentially causing damage to the waterway 134). As represented in FIG. 16A, transition states 500 for the work implement assembly of the work machine 100*a* may accordingly overlap with undesired work portions 502.

As the work machine travels in a first direction 504 (from bottom to top as illustrated), the work implement assembly is lowered too late upon entering the mainland from the headland wherein a portion of the mainland is not engaged, the work implement assembly is then raised too late upon crossing an interior boundary into the waterway wherein a portion of the waterway is engaged, the work implement assembly is then lowered too soon while leaving the waterway wherein another portion of the waterway is engaged, and then finally the work implement assembly is raised too early upon leaving the mainland and entering the headland area wherein another portion of the mainland is not engaged.

As the work machine travels in a second direction 506 (from top to bottom as illustrated), or while working inside the headland (on the left side as illustrated), the same problems are readily identifiable.

Figure 16B:
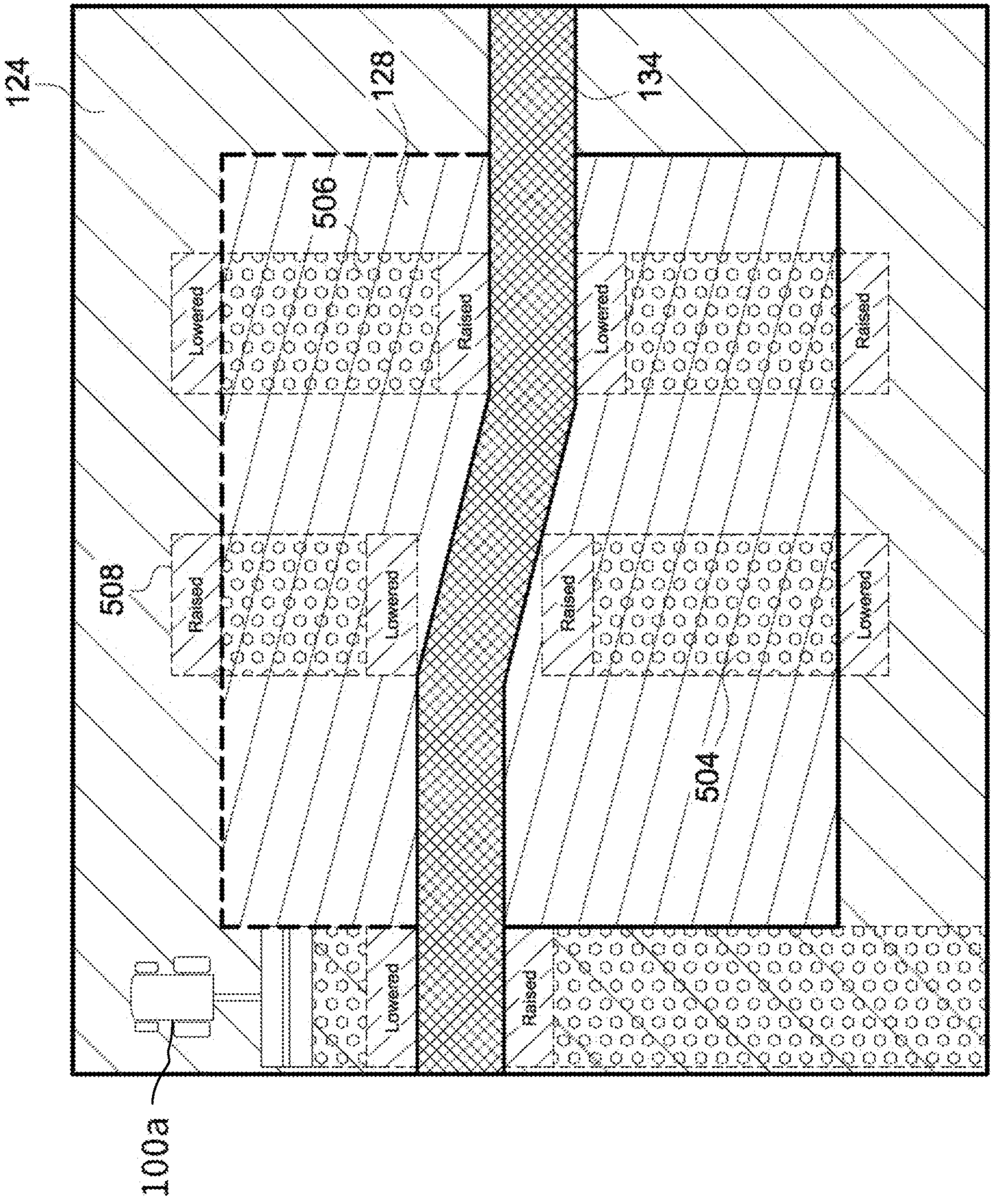

As represented in FIG. 16B, a system and method as disclosed herein may preferably account for the entire working length of the work implement assembly, further in view of the specified overlap rules, etc., such that the undesired work portions 502 are eliminated and each transition state 500 corresponds with a desired work portion 508. It may be understood of course that, for example, portions of the mainland in the immediate vicinity of the waterway have not been engaged where otherwise such an operation would have been desirable, but avoidance of the waterway in this context was prioritized for the respective use case.

Figure 17:
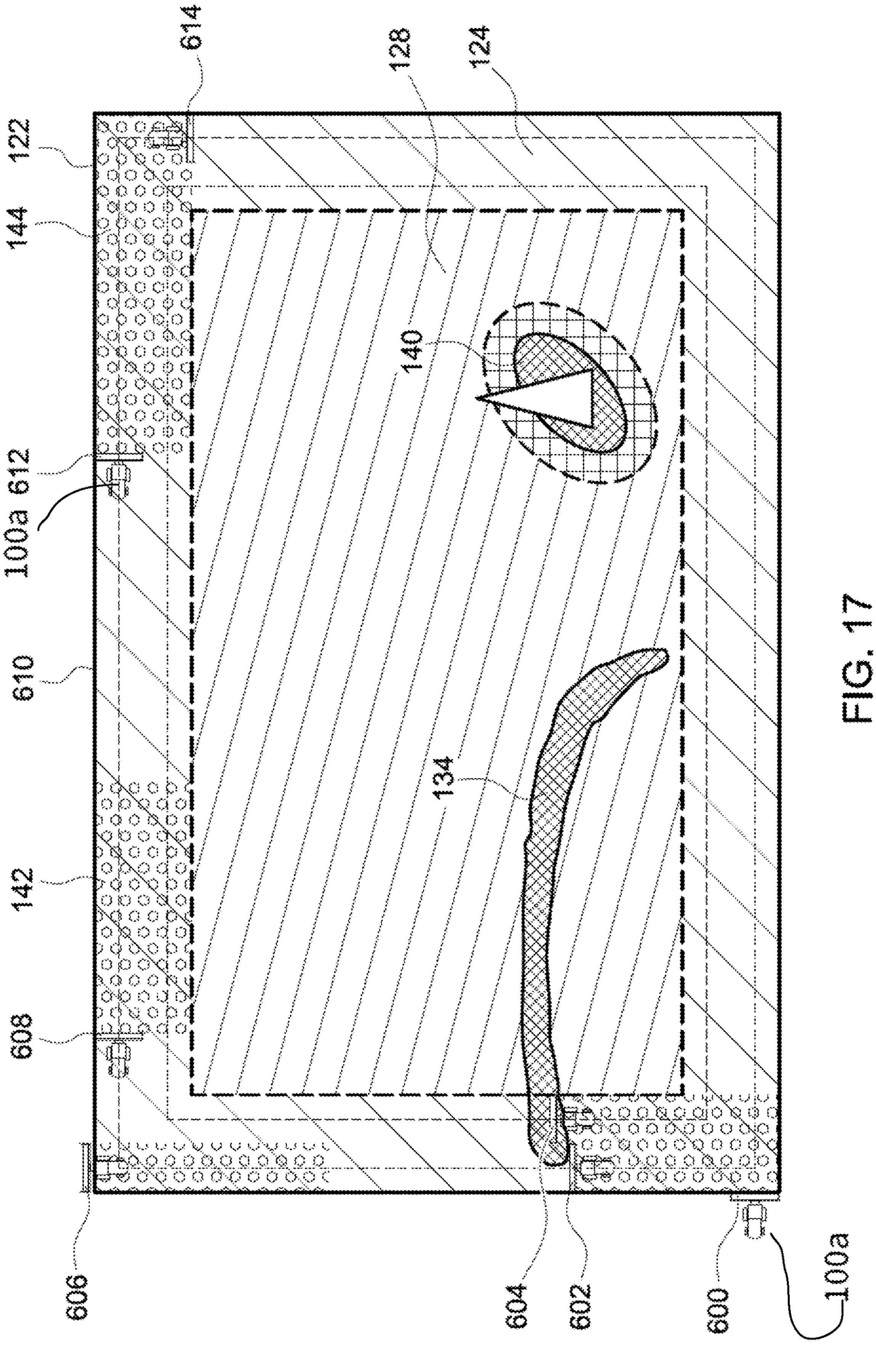
FIG. 17 is an overhead diagram representing an exemplary combine harvester use case with respect to working in the headland area.

As represented in FIG. 17, another use case may be described in the context of a combine harvester operating in a field comprising an exterior boundary 122, a headland 124, a mainland 128, a waterway 134, an interior impassable portion 140, a crop gap area 142, and a prior coverage area 144. This use case is merely illustrative, and is not limiting on a method of the present disclosure with respect to combine operations, and one of skill in the art may further appreciate equivalent use cases for other types of operations and work machines such as for example planters, sprayers, and the like.

As the work machine traverses the exterior boundary 122 and enters the headland 124 (step 600), the work implement assembly (e.g., header) may be lowered accordingly. Whether or not the header is lowered only when entirely within the headland or such that the headland is fully engaged may be dependent on the relevant overlap rule, for example as provided in user customization of the operation.

As the work machine travels along the outer portion of the headland 124, the work machine partially encounters a waterway 134 (step 602), wherein the header may be maintained in a lowered position, for example dependent on the relevant overlap rule.

Alternatively, as the work machine travels along the inner portion of the headland 124 and fully encounters the headland waterway 134 (step 604), the header may be raised to avoid engaging the waterway, again dependent on the relevant overlap rule.

If the work machine passes through the headland 124 and crosses the exterior boundary 122 (step 606), the header may be raised accordingly. Whether or not the header is raised only when entirely outside the headland or such that the headland is fully engaged may be dependent on the relevant overlap rule. If the work machine is turning right and continuing along the headland, but a portion of the header would cross the exterior boundary while making the turn, the header may be raised or lowered dependent on the relevant overlap rule with respect to the exterior boundary.

If the work machine continues to the right along the headland 124 and into the crop gap area 142 (step 608), the header may typically be lowered (if previously raised to avoid the exterior boundary), maintained in a lowered position, or potentially raised, dependent on the relevant overlap rule with respect to the crop gap area.

As the work machine continues to the right out of the crop gap area 142 and back into the primary headland 124 (step 610), the header may typically be lowered (if previously raised during the crop gap area), or maintained in a lowered position, dependent on the relevant overlap rule with respect to the crop gap area.

As the work machine continues to the right along the headland 124 and into the coverage area 144 (step 612), the header may typically be raised, or potentially maintained in a lowered position, dependent on the relevant overlap rule with respect to the coverage area.

As the work machine then exits the coverage area 144 and proceeds back into the primary headland 124 (step 614), the header may typically be lowered, or potentially maintained in a lowered position, dependent on the relevant overlap rule with respect to the coverage area.

Figure 18:
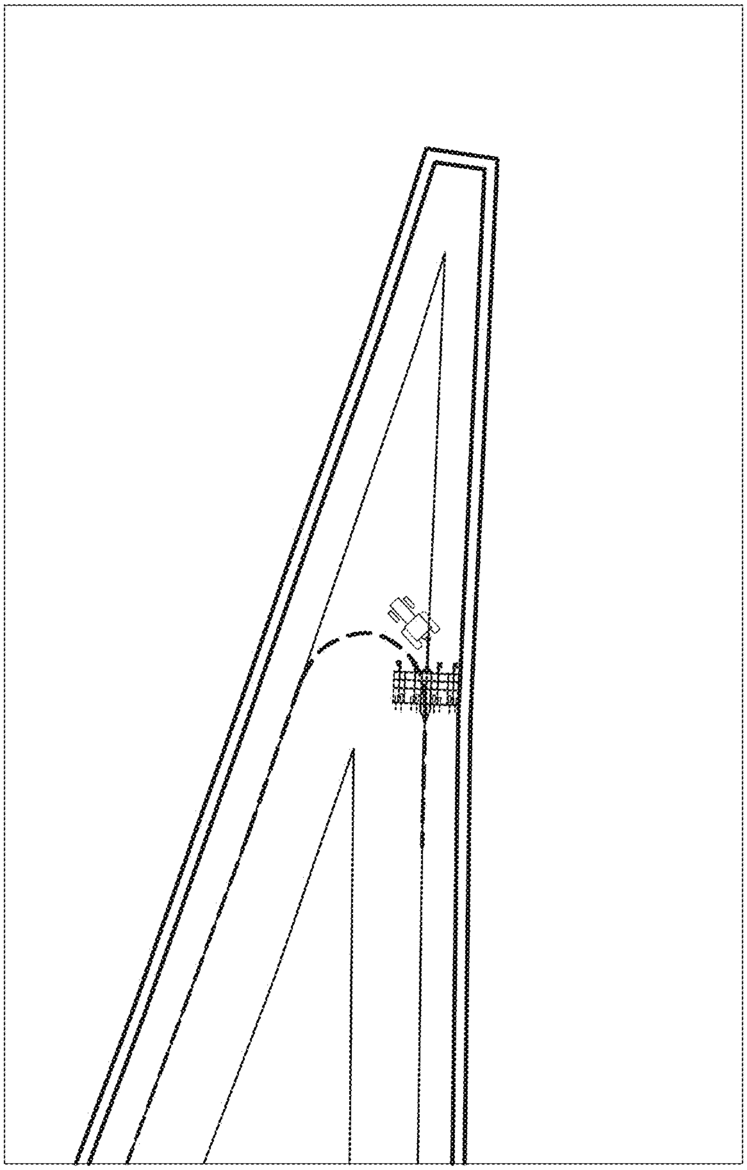
FIG. 18 is an overhead diagram representing an exemplary special maneuver use case according to a system and method of the present disclosure.

As previously noted herein, and further illustrated by reference to FIG. 18, a system and method as disclosed herein may be configured to account for special maneuvers or equivalent use cases wherein a command that would typically be applied during a mainland, headland, or the like is overridden. For example, wherein a route as shown for the work machine may be fully within an area such as a mainland that would otherwise call for the work implement assembly to be fully lowered during operation (in this case, a tillage operation), the user may prefer to raise the work implement assembly during at least a portion of the route due to the sharp turn, which may cause the work implement assembly to extend outside of the exterior boundary or even require backup of the work machine to complete the maneuver. Such special maneuvers may be called for in other contexts, such as for example to avoid potential equipment damage when routing around impassable obstacles, during transitions for in field transport, etc.

In an embodiment, a system and method as disclosed herein may be configured to predict the occurrence of such special maneuvers and likewise further predict engageable surface portions corresponding to the special maneuvers, based for example on a predetermined plan of operation for the field, the operating characteristics (e.g., advance speed, turning capabilities) of the work machine and work implement assembly, field conditions, and the like. A work machine equipped with, e.g., an obstacle detection system may determine conditions in real time for better predicting the occurrence of special maneuvers as may be needed.

In an embodiment, a system and method as disclosed herein may be configured to apply overlap rules based at least in part on a dynamic map of the work area (field), which for example may be updated during operations by one or more work machines to reflect updated coverage areas corresponding to engaged surface portions by the respective work implement assemblies. As an engaged portion of the work area is updated to define a new coverage area, the contours of the coverage area may for example define boundaries with respect to neighboring mainland or headland yet to be worked, and potentially impact the application of overlap rules for subsequent work machine paths encountering the same surface portion.

In an embodiment, a system and method as disclosed herein may be configured to execute additional functions based on geospatial triggering during working operations as otherwise described above. For example, settings or operations for one or more components of the work machine, or of the work implement assembly but independent of the engagement/disengagement functions as otherwise described herein, such as for example the processing of ingested material, changes to cleaning shoe settings, and the like may be triggered in conjunction with an engagement/disengagement transition, and/or in view of a detected location relative to defined settings such as geospatial triggers. Exemplary geospatial triggers may for example correspond with traversal of a waterway, traverse of an exterior boundary for entry or exit of the work area, dynamic alteration in a heading of the work machine away from a predetermined trajectory, and the like. In various embodiments, geospatial triggers for internal control functions, which as defined herein may relate to functions performed independently of the engagement functions as otherwise described, may coincide with an analysis of engageable surface portions of the work area and the triggers for engagement or disengagement. In other embodiments, however, the geospatial triggers for internal control functions may include one or more separate triggers such that an analysis of engageable surface portions of the work area is separate from and unnecessary with respect to an analysis of geospatial triggers for the internal control functions.

In an embodiment, the one or more work machines, or a separate computing device or network of devices functionally linked to the one or more work machines, may further calculate accurate work totals based on the dynamic map by accounting for a difference between an engaged surface portion and an amount of the surface portion which had previously been wholly or partially worked. In an embodiment, the one or more work machines, or a separate computing device or network of devices functionally linked to the one or more work machines, may further or alternatively calculate an efficiency value or an equivalent thereof, based on the amount of the work area that has been engaged but which had previously been worked.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method for controlling operation of a work machine in a work area, the work machine comprising a work implement assembly defining at least a working length and a working width, wherein the working length comprises a leading edge and a trailing edge, and wherein the work implement assembly is configured in response to control signals to operatively engage a surface portion of the work area or to disengage therefrom, the method comprising:

determining respective engagement constraints corresponding to one or more zones and/or boundaries associated with the work area;

during operation by the work machine in the work area, continuously predicting engageable surface portions of the work area to be traversed, and associated constraint levels therefor, wherein a surface area for each of the engageable surface portions corresponds to the at least working length and working width;

determining an operating mode for the work machine during the operation, wherein the operating mode is determined from a plurality of operating modes comprising a first mode specifying full engagement of an engageable surface portion without overlapping constraints, a second mode specifying full disengagement of an engageable surface portion overlapping one or more constraints, and at least one further mode specifying engagement of an engageable surface portion being dependent on a respective amount of partial overlap with one or more constraints therein; and for each predicted engageable surface portion of the work area, prior to traverse thereof, automatically actuating the work implement assembly for engagement or disengagement based on determined engagement constraints corresponding to the predicted engageable surface portion and the operating mode.

2. The method of claim 1, wherein the work machine comprises one or more components for processing of ingested crop material, the method comprising automatically adjusting one or more settings for at least one of the one or more components based on determined internal processing constraints corresponding to the predicted engageable surface portion and the operating mode.

3. The method of claim 2, wherein the plurality of operating modes comprise at least a third mode specifying automatic enabling or disabling of the least one of the one or more components independent of changes to engagement or disengagement of the engageable surface portion.

4. The method of claim 1, further comprising mapping the work area during operation by the work machine therein to store further engagement constraints corresponding to coverage zones and/or boundaries.

5. The method of claim 1, comprising automatically actuating the work implement assembly further based on a look-ahead time between a current leading edge of the work implement assembly and a trailing edge of the predicted engageable surface portion of the work area.

6. The method of claim 5, wherein the look-ahead time is determined based on a current travel speed and/or a system delay associated with transition of the work implement assembly from operative engagement to disengagement.

7. The method of claim 1, wherein the working length and the working width of the work implement assembly are determined by reference to a digital model.

8. The method of claim 7, wherein the digital model is generated based at least in part on observations of the working length and the working width of engaged surface portions during previous operation of the work implement assembly.

9. The method of claim 1, wherein one or more of the plurality of operating modes define overlap of the engageable surface portion with respect to an entire working area of the work implement assembly.

10. The method of claim 1, wherein one or more of the plurality of operating modes define overlap of the engageable surface portion with respect to one or more sides of the working length and/or the working width of the work implement assembly.

11. The method of claim 1, wherein:

operative engagement by the work implement assembly comprises applying treatment to the respective surface portion of the work area; and operative disengagement by the work implement assembly comprises suspending the application of treatment to the respective surface portion of the work area.

12. The method of claim 1, wherein:

operative engagement by the work implement assembly comprises moving the work implement assembly to physically engage with the respective surface portion of the work area; and operative disengagement by the work implement assembly comprises moving the work implement assembly away from physical engagement with the respective surface portion of the work area.

13. A system for controlling a working operation in a work area, the system comprising:

a work machine comprising a work implement assembly defining at least a working length and a working width, wherein the working length comprises a leading edge and a trailing edge, and wherein the work implement assembly is configured in response to control signals to operatively engage a surface portion of the work area or to disengage therefrom; and one or more processors functionally linked to the work machine and configured to:

determine respective engagement constraints corresponding to one or more zones and/or boundaries associated with the work area;

during operation by the work machine in the work area, continuously predict engageable surface portions of the work area to be traversed, and associated constraint levels therefor, wherein a surface area for each of the engageable surface portions corresponds to the at least working length and working width defined by the work implement assembly;

determine an operating mode for the work machine during the operation, wherein the operating mode is determined from a plurality of operating modes comprising a first mode specifying full engagement of an engageable surface portion without overlapping constraints, a second mode specifying full disengagement of an engageable surface portion overlapping one or more constraints, and at least one further mode specifying engagement of an engageable surface portion being dependent on a respective amount of partial overlap with one or more constraints therein; and for each predicted engageable surface portion of the work area, prior to traverse thereof, automatically actuate the work implement assembly for engagement or disengagement based on determined engagement constraints corresponding to the predicted engageable surface portion and the operating mode.

14. The system of claim 13, wherein the work machine comprises one or more components for processing of ingested crop material, and the one or more processors are configured to automatically adjust one or more settings for at least one of the one or more components based on determined internal processing constraints corresponding to the predicted engageable surface portion and the operating mode.

15. The system of claim 14, wherein the plurality of operating modes comprise at least a third mode specifying automatic enabling or disabling of the least one of the one or more components independent of changes to engagement or disengagement of the engageable surface portion.

16. The system of claim 13, wherein the one or more processors are further configured to automatically actuate the work implement assembly further based on a look-ahead time between a current leading edge of the work implement assembly and a trailing edge of the predicted engageable surface portion of the work area.

17. The system of claim 16, wherein the look-ahead time is determined based on a current travel speed and/or a system delay associated with transition of the work implement assembly from operative engagement to disengagement.

18. The system of claim 13, wherein the working length and the working width of the work implement assembly are determined by reference to a digital model, wherein the digital model is generated based at least in part on observations of the working length and the working width of engaged surface portions during previous operation of the work implement assembly.

19. The system of claim 13, wherein:

operative engagement by the work implement assembly comprises applying treatment to the respective surface portion of the work area; and operative disengagement by the work implement assembly comprises suspending the application of treatment to the respective surface portion of the work area.

20. The system of claim 13, wherein:

operative engagement by the work implement assembly comprises moving the work implement assembly to physically engage with the respective surface portion of the work area; and operative disengagement by the work implement assembly comprises moving the work implement assembly away from physical engagement with the respective surface portion of the work area.

* * * * *